United States Patent
Park et al.

(10) Patent No.: US 10,685,423 B2
(45) Date of Patent: *Jun. 16, 2020

(54) DETERMINATION OF PER LINE BUFFER UNIT MEMORY ALLOCATION

(71) Applicant: Google LLC, Mountain View, CA (US)

(72) Inventors: Hyunchul Park, Santa Clara, CA (US); Albert Meixner, Mountain View, CA (US); Qiuling Zhu, San Jose, CA (US); William Mark, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/585,834

(22) Filed: Sep. 27, 2019

(65) Prior Publication Data

US 2020/0098083 A1     Mar. 26, 2020

Related U.S. Application Data

(63) Continuation of application No. 15/594,512, filed on May 12, 2017, now Pat. No. 10,430,919.

(51) Int. Cl.
*G06T 1/60* (2006.01)
*G06T 1/20* (2006.01)
(Continued)

(52) U.S. Cl.
CPC .............. *G06T 1/60* (2013.01); *G06F 3/0604* (2013.01); *G06F 3/068* (2013.01); *G06F 3/0631* (2013.01);
(Continued)

(58) Field of Classification Search
None
See application file for complete search history.

(56) References Cited

U.S. PATENT DOCUMENTS

| 5,398,079 A | 3/1995 | Liu |
| 7,728,842 B2 | 6/2010 | Honmi |

(Continued)

FOREIGN PATENT DOCUMENTS

| CN | 106104488 A | 11/2016 |
| TW | I297468 | 6/2008 |

(Continued)

OTHER PUBLICATIONS

Bartic et al. "Mapping concurrent applications on network-on-chip platforms," IEEE Workshop on Signal Processing Systems Design and Implementation, Nov. 2005, 6 pages.
(Continued)

*Primary Examiner* — Joni Hsu
(74) *Attorney, Agent, or Firm* — Fish & Richardson P.C.

(57) ABSTRACT

A method is described. The method includes simulating execution of an image processing application software program. The simulating includes intercepting kernel-to-kernel communications with simulated line buffer memories that store and forward lines of image data communicated from models of producing kernels to models of consuming kernels. The simulating further includes tracking respective amounts of image data stored in the respective line buffer memories over a simulation runtime. The method also includes determining respective hardware memory allocations for corresponding hardware line buffer memories from the tracked respective amounts of image data. The method also includes generating configuration information for an image processor to execute the image processing application software program. The configuration information describes the hardware memory allocations for the hardware line buffer memories of the image processor.

17 Claims, 33 Drawing Sheets

(51) Int. Cl.
*G09G 5/36* (2006.01)
*G06F 3/06* (2006.01)
*G06F 9/50* (2006.01)
*G06F 30/20* (2020.01)
*G06F 30/33* (2020.01)
G06F 12/084 (2016.01)
G06F 12/0842 (2016.01)
G06F 117/08 (2020.01)

(52) U.S. Cl.
CPC .......... *G06F 3/0659* (2013.01); *G06F 3/0664* (2013.01); *G06F 9/5016* (2013.01); *G06F 30/20* (2020.01); *G06F 30/33* (2020.01); *G06T 1/20* (2013.01); *G09G 5/363* (2013.01); *G06F 12/084* (2013.01); *G06F 12/0842* (2013.01); *G06F 2117/08* (2020.01); *G06F 2212/455* (2013.01); *G06F 2212/601* (2013.01)

(56) References Cited

U.S. PATENT DOCUMENTS

| | | | |
|---|---|---|---|
| 7,818,725 | B1 | 10/2010 | Agarwal |
| 8,024,549 | B2 | 9/2011 | Stewart |
| 2003/0065688 | A1 | 4/2003 | Dageville et al. |
| 2006/0036798 | A1 | 2/2006 | Dickey et al. |
| 2009/0150135 | A1 | 6/2009 | Cressman |
| 2011/0191758 | A1 | 8/2011 | Scharf |
| 2013/0194286 | A1* | 8/2013 | Bourd ............... G06F 9/544 345/545 |
| 2014/0040855 | A1* | 2/2014 | Wang ................. G06F 8/34 717/107 |
| 2015/0055861 | A1* | 2/2015 | Wang ............... G06T 3/4015 382/167 |
| 2016/0378441 | A1 | 12/2016 | Baker et al. |

FOREIGN PATENT DOCUMENTS

WO WO 2016/171869 10/2016
WO WO 2016/171893 10/2016

OTHER PUBLICATIONS

Daga et al. "Architecture-Aware Mapping and Optimization on a 1600-Core GPU," 17$^{th}$ IEEE International Conference on Parallel and Distributed Systems, Dec. 2011, 8 pages.
Dummler et al. "Mapping Algorithms for Multiprocessor Tasks on Multi-core Clusters," 37$^{th}$ International Conference on Parallel Processing, Sep. 2008, 8 pages.
PCT International Search Report and Written Opinion issued in International Application No. PCT/US2018012875, dated May 9, 2018, 16 pages.
PCT International Preliminary Report on Patentability issued in International Application No. PCT/US2018012875, dated Nov. 12, 2019, 16 pages.
Keinert et al. "Actor-Oriented Modeling and Simulation of Sliding Window Image Processing Algorithms," IEEE Workshop on Embedded Systems for Real-Time Multimedia, Oct. 2007, 6 pages.
Keinert et al. "Simulative Buffer Analysis of Local Image Processing Algorithms Described by Windowed Synchronous Data Flow," IEEE International Conference on Embedded Computer Systems: Architectures, Modeling and Simulation, Jul. 2007, 8 pages.
Lin et al. "Heterogeneous Multiprocessor Mapping for Real-Time Streaming Systems," IEEE International Conference on Acoustics, Speech and Signal Processing, May 2011, 4 pages.
Park et al. "Modulo Graph Embedding: Mapping Applications onto Course-Grained Reconfigurable Architectures," Proceedings of the 2006 International Conference on Compilers Architecture, Synthesis for Embedded Systems, ACM, Oct. 2006, 11 pages.
TW Office Action in Taiwanese Appln. No. 10820239060, dated Mar. 18, 2019, 15 pages (with English translation).

* cited by examiner

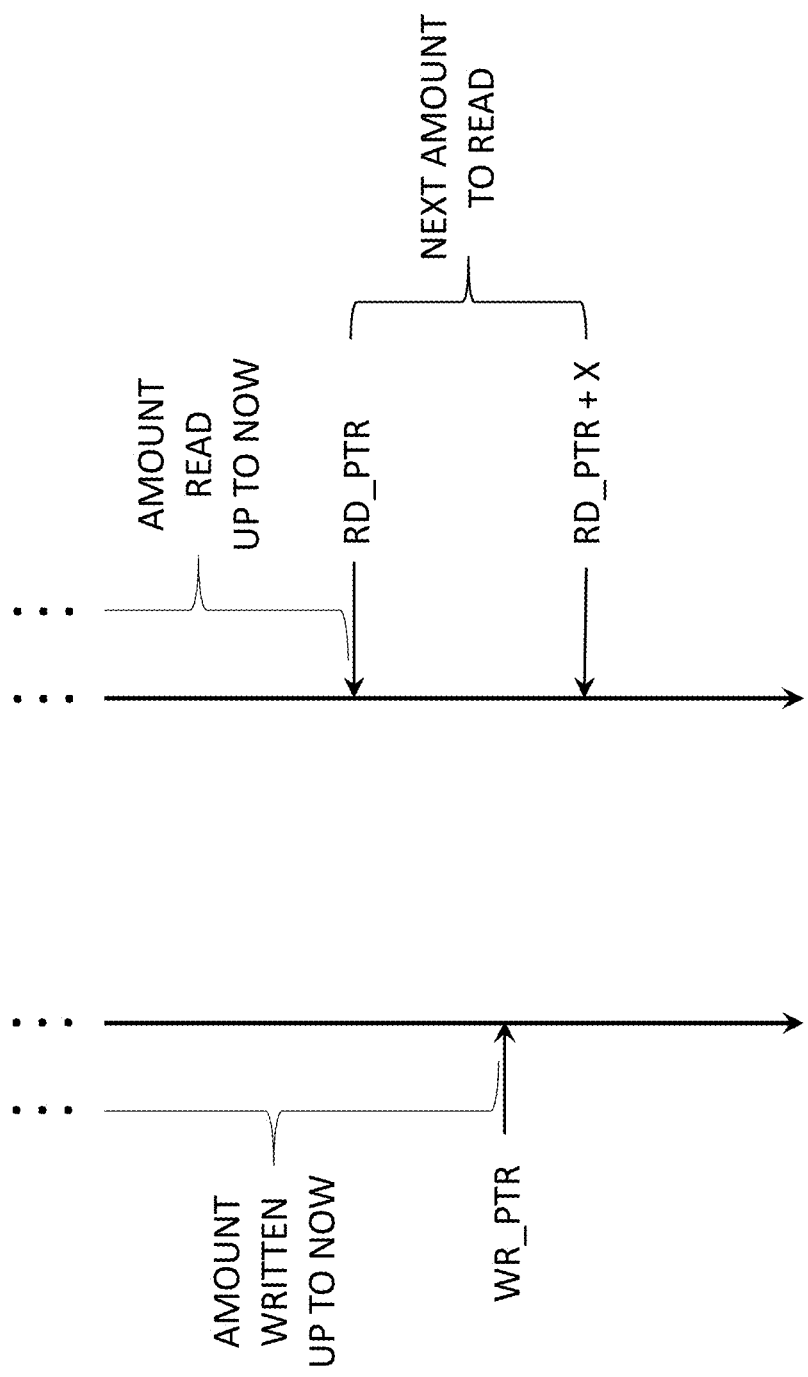

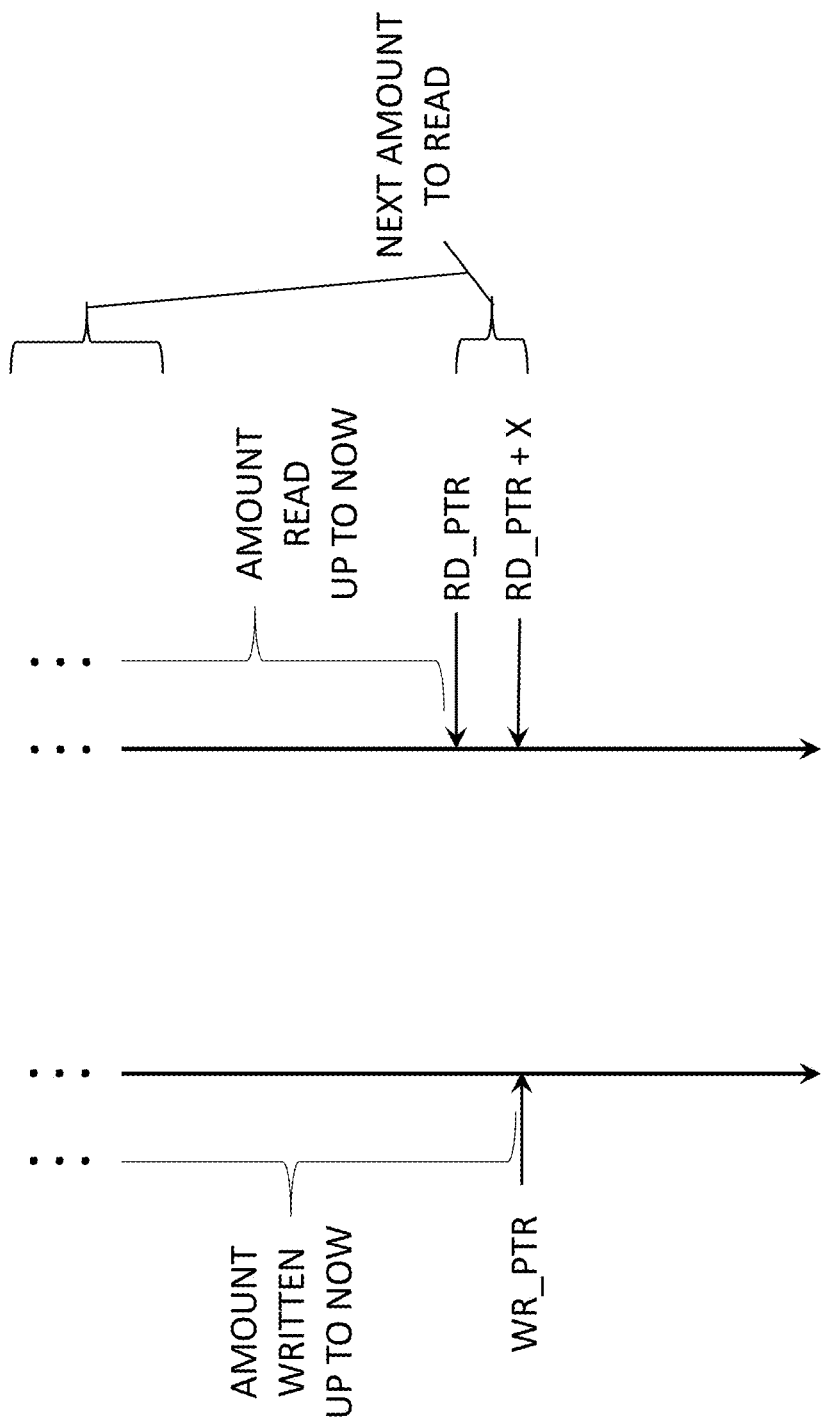

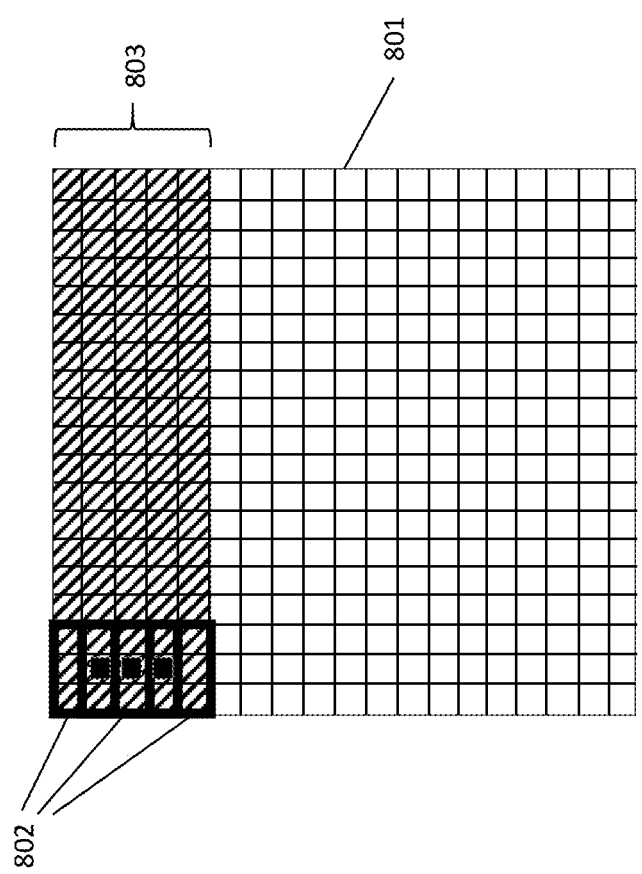

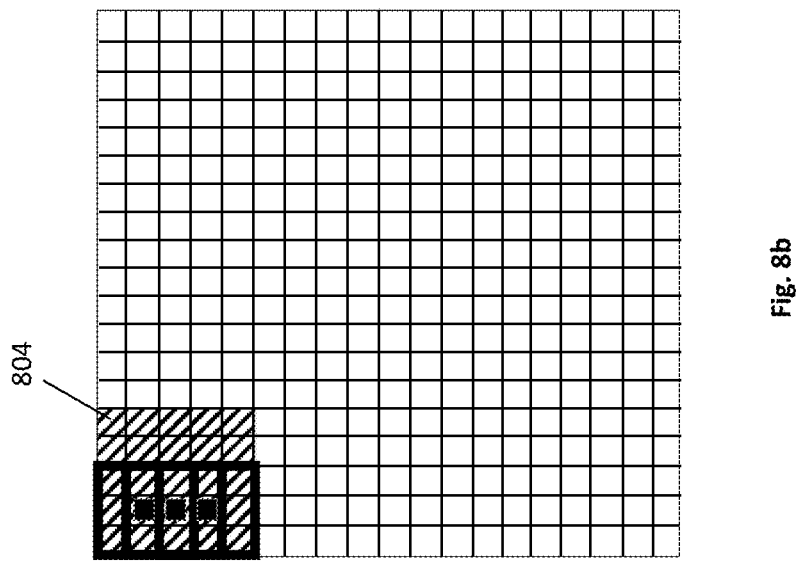

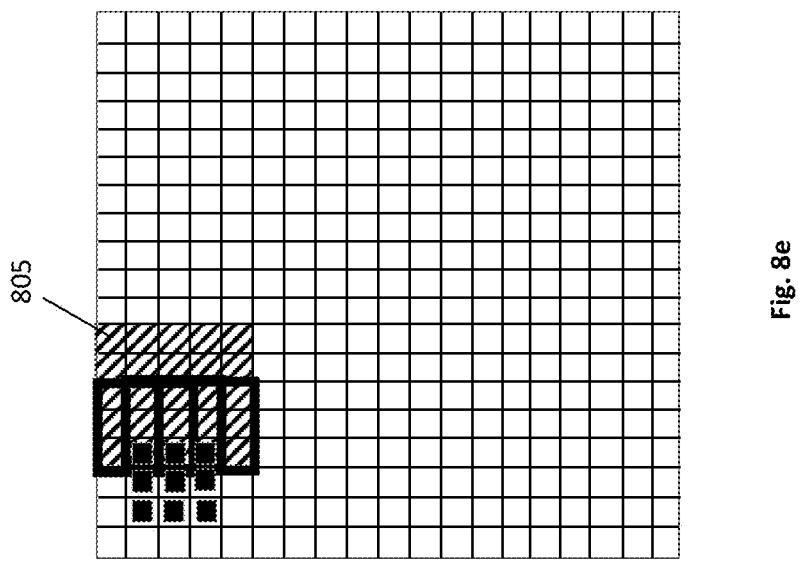

| Scalar instruction 951 | 2D ALU Instruction 952 | Memory Access Instruction 953 | Immediate Operand 954 |
|---|---|---|---|

Fig. 9b

```
// thread X1: process stencil 1 //
shift down 1
shift right 1
load // put A in R1
shift left 1
R1 <== ADD R1, R2 // add A, B
```

```
// thread X2: process stencil 2 //
shift down 1
shift right 1
load // put F in R1
shift left 1
R1 <== ADD R1, R2 // add F, G
```

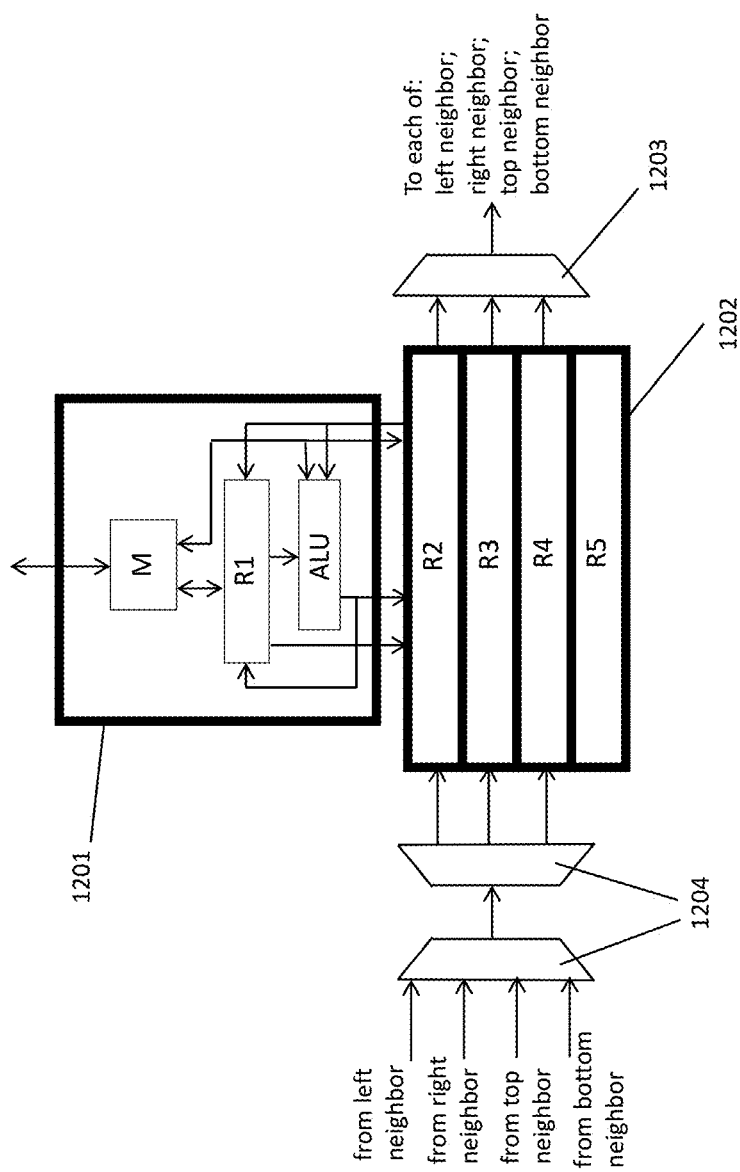

DETERMINATION OF PER LINE BUFFER UNIT MEMORY ALLOCATION

CROSS-REFERENCE TO RELATED APPLICATION

This is a continuation of U.S. application Ser. No. 15/594,512, filed on May 12, 2017, now issued as U.S. Pat. No. 10,430,919, on Oct. 1, 2019, the disclosure of which is considered part of and is incorporated by reference in the disclosure of this application.

FIELD OF INVENTION

The field of invention pertains generally to the computing sciences and, more specifically, to the determination of per line buffer unit memory allocation.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hardwired circuitry to much larger units of data. The use of larger (as opposed to finer grained) units of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

A method is described. The method includes simulating execution of an image processing application software program. The simulating includes intercepting kernel-to-kernel communications with simulated line buffer memories that store and forward lines of image data communicated from models of producing kernels to models of consuming kernels. The simulating further includes tracking respective amounts of image data stored in the respective line buffer memories over a simulation runtime. The method also includes determining respective hardware memory allocations for corresponding hardware line buffer memories from the tracked respective amounts of image data. The method also includes generating configuration information for an image processor to execute the image processing application software program. The configuration information describes the hardware memory allocations for the hardware line buffer memories of the image processor.

FIGURES

The following description and accompanying drawings are used to illustrate embodiments of the invention. In the drawings:

FIGS. 5a and 5b show write pointer and read pointer behavior of a line buffer unit model;

FIGS. 6a, 6b, 6c, 6d and 6e show full line group transfer mode, virtually tall transfer mode and read pointer behavior for block image transfers;

FIGS. 8a, 8b, 8c, 8d and 8e depict the parsing of image data into a line group, the parsing of a line group into a sheet and the operation performed on a sheet with overlapping stencils;

FIG. 9b shows an embodiment of an instruction word of the stencil processor;

FIG. 12 shows an embodiment of a unit cell for an integrated execution lane array and two-dimensional shift array;

DETAILED DESCRIPTION 1.0 Unique Image Processor Architecture

As is known in the art, the fundamental circuit structure for executing program code includes an execution stage and register space. The execution stage contains the execution units for executing instructions. Input operands for an instruction to be executed are provided to the execution stage from the register space. The resultant that is generated from the execution stage's execution of an instruction is written back to the register space.

Execution of a software thread on a traditional processor entails sequential execution of a series of instructions through the execution stage. Most commonly, the operations are "scalar" in the sense that a single resultant is generated from a single input operand set. However in the case of "vector" processors, the execution of an instruction by the execution stage will generate a vector of resultants from a vector of input operands.

Figure 1:
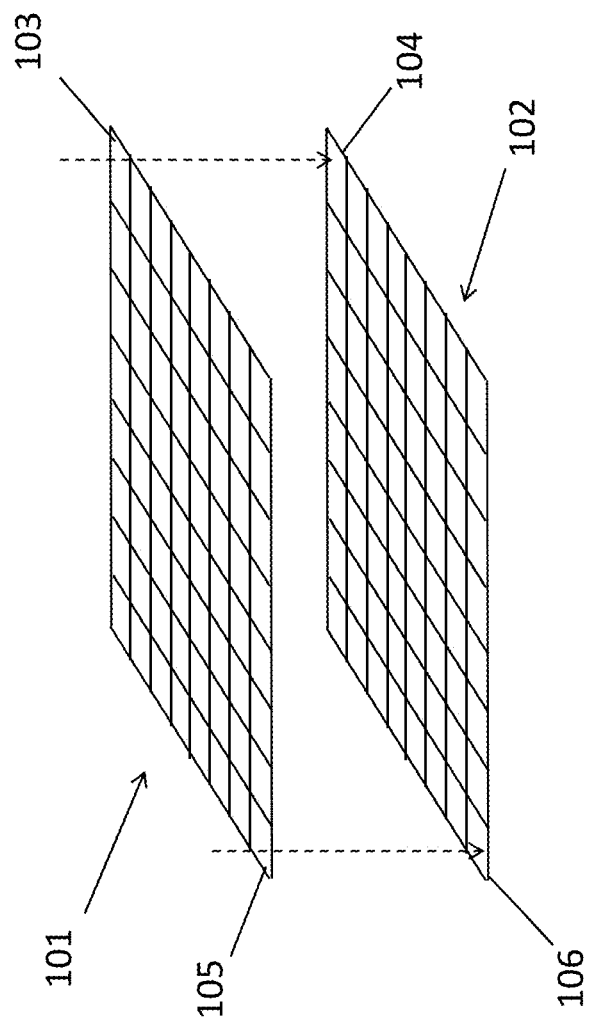
FIG. 1 shows a high level view of a stencil processor architecture.

FIG. 1 shows a high level view of a unique image processor architecture 100 that includes an array of execution lanes 101 coupled to a two-dimensional shift register array 102. Here, each execution lane in the execution lane array can be viewed as a discrete execution stage that contains the execution units needed to execute the instruction set supported by the processor 100. In various embodiments each execution lane receives a same instruction to execute in a same machine cycle so that the processor operates as a two dimensional single instruction multiple data (SIMD) processor.

Each execution lane has its own dedicated register space in a corresponding location within the two dimensional shift register array 102. For example, corner execution lane 103 has its own dedicated register space in corner shift register location 104, corner execution lane 105 has its own dedicated register space in corner shift register location 106, etc.

Additionally, the shift register array 102 is able to shift its contents so that each execution lane is able to directly operate, from its own register space, upon a value that was resident in another execution lane's register space during a prior machine cycle. For example, a +1 horizontal shift causes each execution lane's register space to receive a value from its leftmost neighbor's register space. On account of an ability to shift values in both left and right directions along a horizontal axis, and shift values in both up and down directions along a vertical axis, the processor is able to efficiently process stencils of image data.

Here, as is known the art, a stencil is a slice of image surface area that is used as a fundamental data unit. For example, a new value for a particular pixel location in an output image may be calculated as an average of the pixel values in an area of an input image that the particular pixel location is centered within. For example, if the stencil has a dimension of 3 pixels by 3 pixels, the particular pixel location may correspond to the middle pixel of the 3×3 pixel array and the average may be calculated over all nine pixels within the 3×3 pixel array.

According to various operational embodiments of the processor 100 of FIG. 1, each execution lane of the execution lane array 101 is responsible for calculating a pixel value for a particular location in an output image. Thus, continuing with the 3×3 stencil averaging example mentioned just above, after an initial loading of input pixel data and a coordinated shift sequence of eight shift operations within the shift register, each execution lane in the execution lane array will have received into its local register space all nine pixel values needed to calculate the average for its corresponding pixel location. That is, the processor is able to simultaneously process multiple overlapping stencils centered at, e.g., neighboring output image pixel locations. Because the processor architecture of FIG. 1 is particularly adept at processing over image stencils it may also be referred to as a stencil processor.

Figure 2:
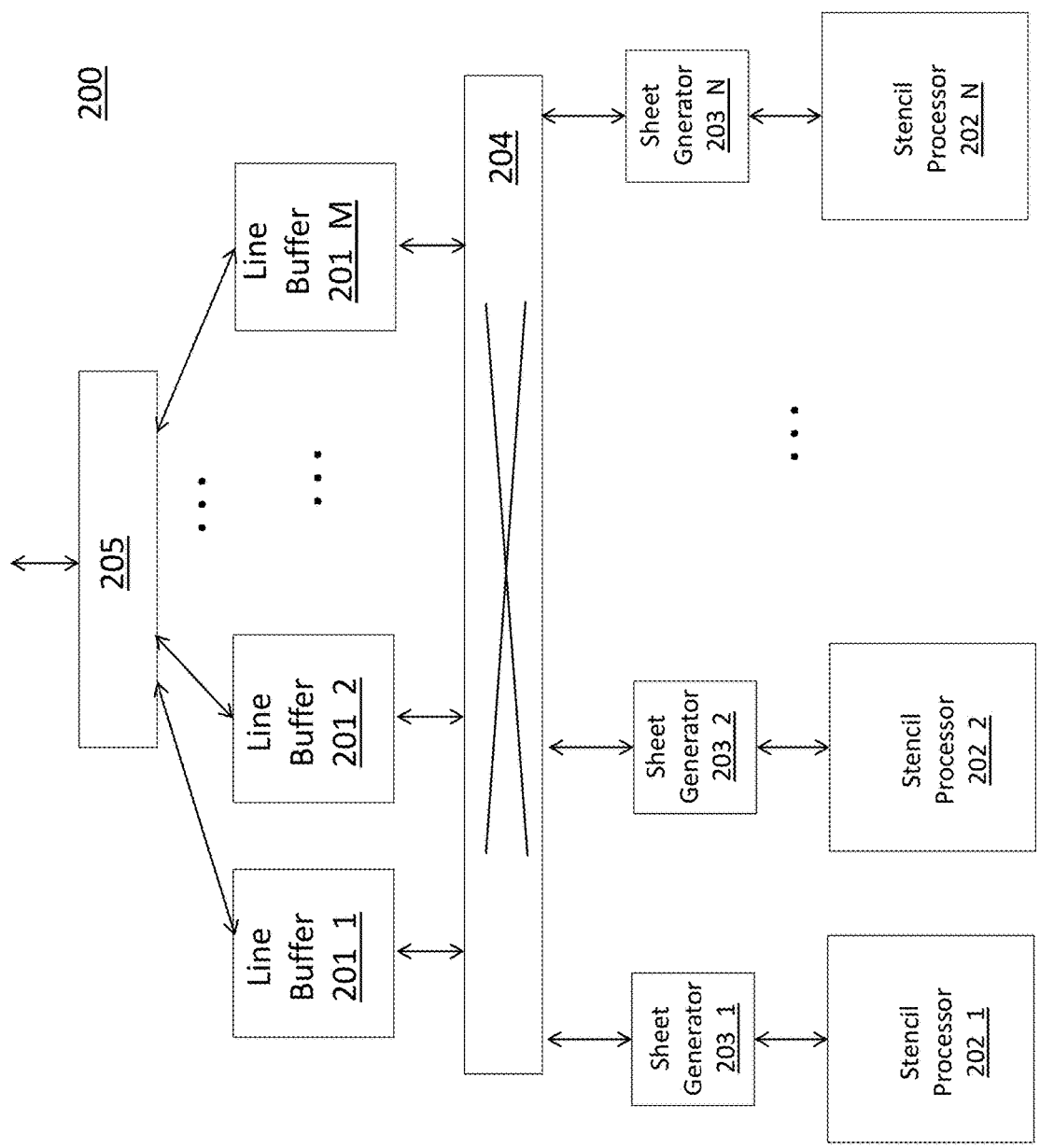
FIG. 2 shows a more detailed view of an image processor architecture.

FIG. 2 shows an embodiment of an architecture 200 for an image processor having multiple stencil processors 202_1 through 202_N. As observed in FIG. 2, the architecture 200 includes a plurality of line buffer units 201_1 through 201_M interconnected to a plurality of stencil processor units 202_1 through 202_N and corresponding sheet generator units 203_1 through 203_N through a network 204 (e.g., a network on chip (NOC) including an on chip switch network, an on chip ring network or other kind of network). In an embodiment, any line buffer unit 201_1 through 201_M may connect to any sheet generator 203_1 through 203_N and corresponding stencil processor 202_1 through 202_N through the network 204.

Program code is compiled and loaded onto a corresponding stencil processor 202 to perform the image processing operations earlier defined by a software developer (program code may also be loaded onto the stencil processor's associated sheet generator 203, e.g., depending on design and implementation). In at least some instances an image processing pipeline may be realized by loading a first kernel program for a first pipeline stage into a first stencil processor 202_1, loading a second kernel program for a second pipeline stage into a second stencil processor 202_2, etc., where the first kernel performs the functions of the first stage of the pipeline, the second kernel performs the functions of the second stage of the pipeline, etc., and additional control flow methods are installed to pass output image data from one stage of the pipeline to the next stage of the pipeline.

In other configurations, the image processor may be realized as a parallel machine having two or more stencil processors 202_1, 202_2 operating the same kernel program code. For example, a highly dense and high data rate stream of image data may be processed by spreading frames across multiple stencil processors each of which perform the same function.

In yet other configurations, essentially any directed acyclic graph (DAG) of kernels may be loaded onto the image processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 205 and passed to one or more of the line buffer units 201 on a frame by frame basis. A particular line buffer unit parses its frame of image data into a smaller region of image data, referred to as a "line group", and then passes the line group through the network 204 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 201_1 which parses the image data into line groups and directs the line groups to the sheet generator 203_1 whose corresponding stencil processor 202_1 is executing the code of the first kernel in the pipeline/DAG. Upon completion of operations by the stencil processor 202_1 on the line groups it processes, the sheet generator 203_1 sends output line groups to a "downstream" line buffer unit 201_2 (in some use cases the output line group may be sent_back to the same line buffer unit 201_1 that earlier had sent the input line groups).

One or more "consumer" kernels that represent the next stage/operation in the pipeline/DAG executing on their own respective other sheet generator and stencil processor (e.g., sheet generator 203_2 and stencil processor 202_2) then receive from the downstream line buffer unit 201_2 the image data generated by the first stencil processor 202_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

As alluded to above with respect to FIG. 1, each stencil processor 202_1 through 202_N is designed to simultaneously operate on multiple overlapping stencils of image data. The multiple overlapping stencils and internal hardware processing capacity of the stencil processor effectively determines the size of a sheet. Again, as discussed above, within any of stencil processors 202_1 through 202_N, arrays of execution lanes operate in unison to simultaneously process the image data surface area covered by the multiple overlapping stencils.

Additionally, in various embodiments, sheets of image data are loaded into the two-dimensional shift register array of a stencil processor 202 by that stencil processor's corresponding (e.g., local) sheet generator 203. The use of sheets and the two-dimensional shift register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable. More details concerning the operation of the line buffer units, sheet generators and stencil processors are provided further below in Section 3.0.

2.0 Determination of Per Line Buffer Unit Memory Allocation

As can be understood from the above discussion, the hardware platform is able to support a myriad of different application software program structures. That is, a practically unlimited number of different and complex kernel-to-kernel connections can be supported.

A challenge is understanding how much memory space each line buffer unit 201_1 through 201_M should be allocated for any particular software application. Here, in an embodiment, various ones of the line buffer units have access to their own respective memory that has been allocated to them, e.g., from a physically shared memory. As such, a line buffer unit may be characterized more generally as a line buffer memory. During program execution, a line buffer unit temporarily stores into its respective memory the data it receives, e.g., from a producing kernel. Upon a consuming kernel being ready to receive the data, the line buffer unit reads the data from its respective memory and forwards it to the consuming kernel.

With one or more or all of the line buffer units being physically coupled to a same shared memory resource, configuration of an application software program for execution on the image processor therefore includes defining how much memory capacity of the shared memory resource should be allocated to each line buffer units individually that share the memory resource. Articulating a workable memory allocation for each line buffer unit can be very difficult to determine, especially for complex application software programs having complex data flows and associated data dependencies.

Figure 3:
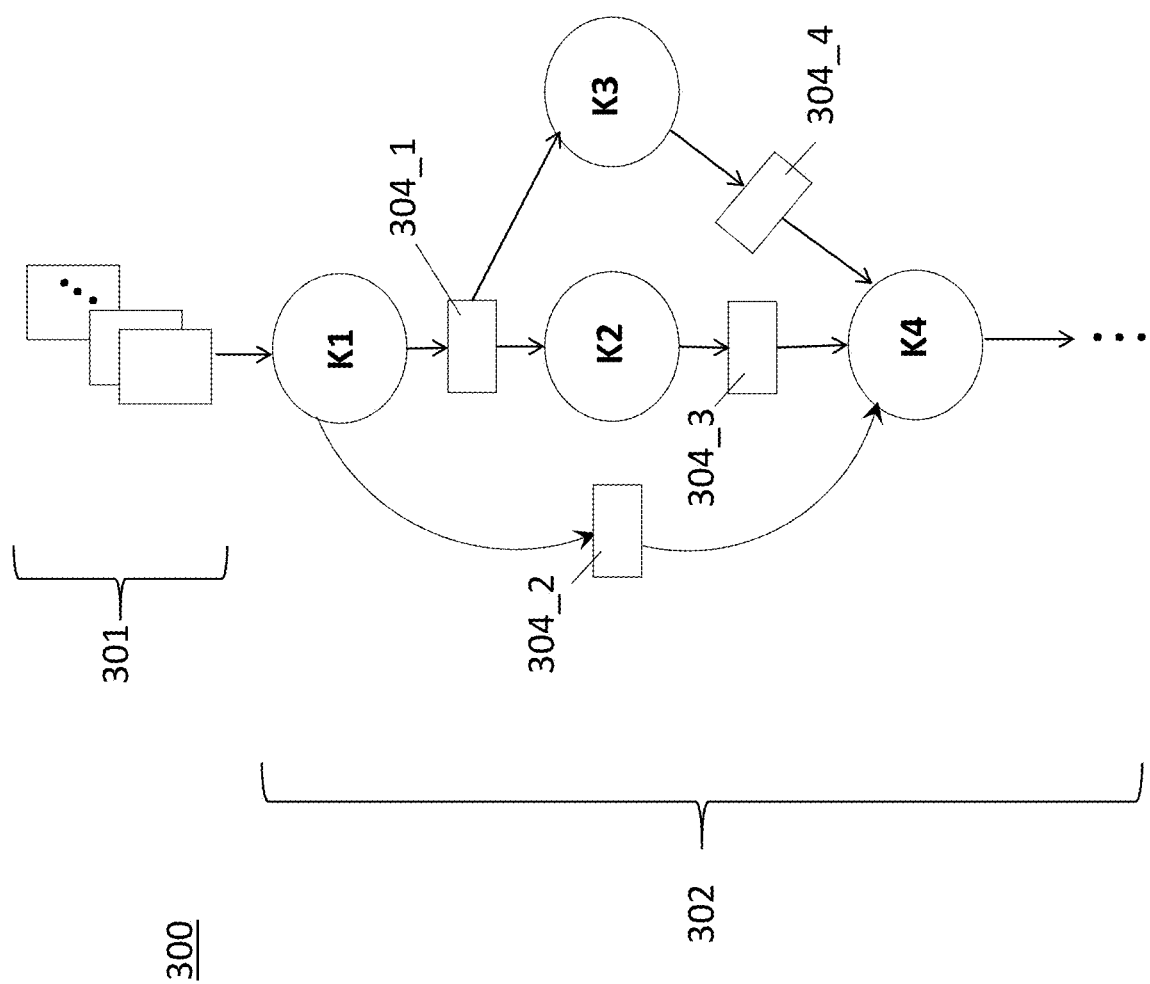
FIG. 3 shows an application software program that can be executed by an image processor.

FIG. 3 shows an example of an exemplary somewhat complex application software program (or portion thereof) and its line buffer unit configuration on the image processor. In various implementations, a producing kernel is permitted to generate separate, different output image streams for different consuming kernels. Additionally, a producing kernel is also permitted to generate a single output stream that is consumed by two or more different kernels. Finally, in various embodiments, a line buffer unit can receive an input stream from only one producing kernel but is able to feed that stream to one or more consuming kernels.

The application software configuration of FIG. 3 demonstrates each of these configuration possibilities. Here, kernel K1 produces a first data stream for both of kernels K2 and K3 and produces a second, different data stream for kernel K4. Kernel K1 sends the first data stream to line buffer unit 304_1 which forwards the data to both of kernels K2 and K3. Kernel K1 also sends the second data stream to line buffer unit 304_2 which forwards the data to kernel K4. Additionally, kernel K2 sends a data stream to kernel K4 and kernel K3 sends a data stream to kernel K4. Kernel K2 sends its data stream to line buffer unit 304_3 which forwards the data to kernel K4. Kernel K3 sends its data stream to line buffer unit 304_4 which forwards the data to kernel K4.

Here, the amount of memory to be uniquely allocated to each of line buffer units 304_1 through 304_4 is difficult to calculate explicitly. Looking at each such memory allocation as a queue, the needed memory amount tends to increase if the line buffer unit will receive large amounts of data from a producing kernel over time. By contrast, the needed memory amount tends to decrease if the line buffer unit will receive small amounts of data from the producing kernel over time. Likewise, the needed memory amount tends to increase if the line buffer unit will send small amounts of data over time to more consuming kernels, or, the needed memory amount tends to decrease if the line buffer unit will send large amounts of data over time to fewer consuming kernels.

The amount of data that the line buffer unit will receive over time from the producer kernel can be a function of any of: 1) the dependencies that the producing kernel has on its own input data; 2) the rate at which the producing kernel generates output data irrespective of the dependencies/rates of 1) above; and, 3) the size of the data units that the producing kernel sends to the line buffer unit. Likewise, the amount of data that the line buffer unit will send over time can be a function of any of: 1) the number of consuming kernels that the producing kernel feeds; 2) the respective rates at which each of the consuming kernels of 1) are ready to receive new data (which can be a function of other data dependencies that the consuming kernels have); and, 3) the size of the data units that the consuming kernel(s) receive from the line buffer unit.

Because, at least for somewhat complex application software program structures, the complicated nature of the various inter-dependencies and connection rates makes it very difficult to explicitly calculate the correct amount of memory space to be allocated to each line buffer unit, in various embodiments, a heuristic approach is taken that simulates the execution of the application software program pre runtime in a simulation environment and monitors the queued data amounts at each line buffer unit that result from the internal data flows of the simulated program.

Figure 4:
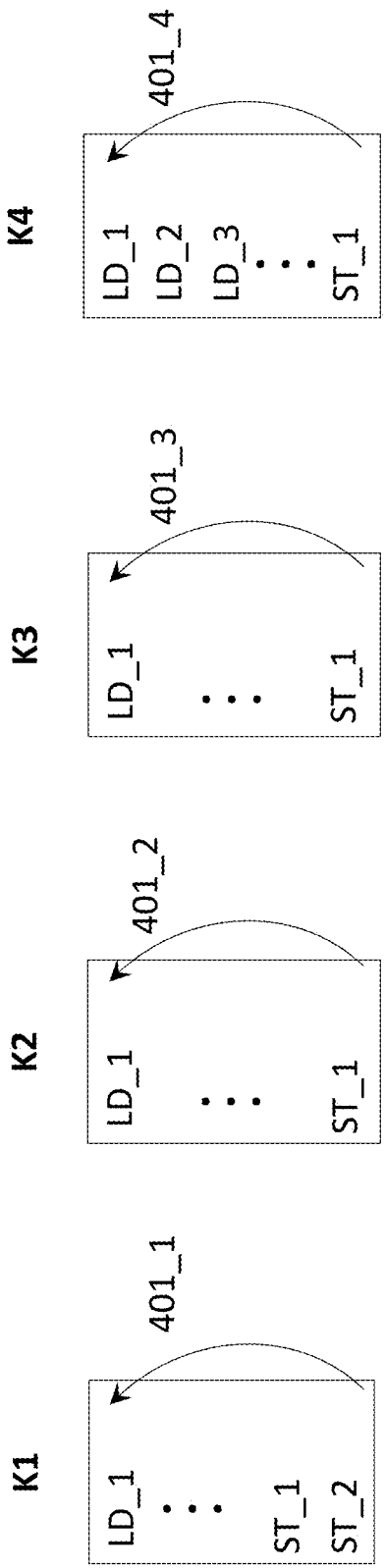
FIG. 4 shows a plurality of kernel models.

FIG. 4 depicts a preparatory procedure for the application software program of FIG. 3 that is undertaken to setup the simulation environment. In an embodiment, a simulation model for each kernel is created by stripping each kernel down to its load instructions and its store instructions. A kernel's load instruction corresponds to the kernel's consuming of input data from a line buffer unit and a kernel's store instruction corresponds to the kernel's producing of output data for writing into a line buffer unit. As discussed above, a kernel can be configured to receive multiple different input streams from, e.g., multiple different kernels/line buffer units. As such, the actual kernels and their simulation model kernels can include multiple load instructions (one for each different input stream). Also as discussed above, a kernel (and therefore a simulation model kernel) can be configured to feed different kernels with different producing streams. As such, an actual kernel and its simulation model kernel can include multiple store instructions.

Referring to FIG. 4, simulation model kernel K1 shows one load instruction (LD_1) and two store instructions (ST_1 and ST_2) consistent with the depiction of kernel K1 in FIG. 3 that shows kernel K1 receiving one input stream (the input data to the image processor) and providing two output streams (one to line buffer unit 304_1 and another to line buffer unit 304_2). FIG. 4 also shows one load instruction and one store instruction for simulation model kernel K2 which is consistent with the depiction of kernel K2 in FIG. 3 that shows kernel K2 receiving one input stream from line buffer unit 304_1 and producing one output stream to line buffer unit 304_3. FIG. 4 also shows one load instruction and one store instruction for simulation model kernel K3 which is consistent with the depiction of kernel K3 in FIG. 3 that shows kernel K3 receiving one input stream from line buffer unit 304_1 and producing one output stream to line buffer unit 304_4. Finally, FIG. 4 shows simulation model kernel K4 having three load instructions and one store instruction which is consistent with the depiction of kernel K4 in FIG. 3 which shows kernel K3 receiving a first input stream from line buffer unit 304_2, receiving a second input stream from line buffer unit 304_3 and receiving a third input stream from line buffer unit 304_4. Kernel K4 also is shown in FIG. 3 as generating one output stream.

As indicated by loops 401_1 through 401_4 of FIG. 4, the simulation model kernels (like the actual kernels), repeatedly loop. That is, at the beginning of execution a kernel executes its load instruction(s) to receive its input data, at the end of execution a kernel executes it store instructions to produce its output data from the input data that it received from its load instructions. Then the process repeats. In various embodiments each simulation model kernel may also contain a value that is indicative of the amount of time the kernel consumes (its propagation delay) performing operations on the input data in order to generate its output data. That is, the simulation model kernel does not permit its store instructions to be executed until some number of cycles after its load instructions have been executed. Additionally, in various embodiments, in order to reduce the time consumed performing the simulation, the kernel models are stripped of their actual image processing routines. That is, no actual image processing is performed by the simulation, only data transfers of "dummy" data are simulated.

After the simulation model kernels have been constructed they are connected to one another through respective simulation models of line buffer units consistent with the design/architecture of the overall application software program. Essentially, continuing to use the application software program of FIG. 3 as an example, a simulation model of the application software program 300 is constructed in a simulation environment where the simulation model contains the simulation models for kernels K1 through K4 of FIG. 4 interconnected through respective simulation models of line buffer units 304_1 through 304_4 consistent with the architecture depicted in FIG. 3.

In order to study the memory needs at each line buffer unit, a simulated input image data stream (e.g., a simulation of input image data 301 of FIG. 3) is presented to the simulation model of the application. The simulation model of the application software program then executes with the simulation model kernels repeatedly consuming simulated amounts of input data through execution of their load instruction(s), generating simulated amounts of output data from the received input data by way of their store instruction(s) and repeating.

Here, each simulated load instruction may incorporate or otherwise be based upon some input image data formatting that exists in the original source kernel (such as number of lines in an input line group, maximum input line group rate, dimensions/size of input blocks, maximum input block rate, etc.) to determine the simulated amounts and rates of input data being consumed. Likewise, each store instruction may specify or otherwise be based upon some output image formatting that exists in the original source kernel (such as number of lines in an output line group, maximum output line group rate, dimensions/size of output blocks, maximum output block rate, etc.) to determine that amounts and rates of output data being produced. In an embodiment, the load/store instructions of the kernel models and the line buffer unit model's handling of them reflect the actual handshaking of the application software and underlying hardware platform in that, e.g., a specific next portion of image data being produced is identified by a producing model kernel's store instruction and a specific next portion of image data being requested is identified by consuming model kernel's load instruction.

Figure 5B:
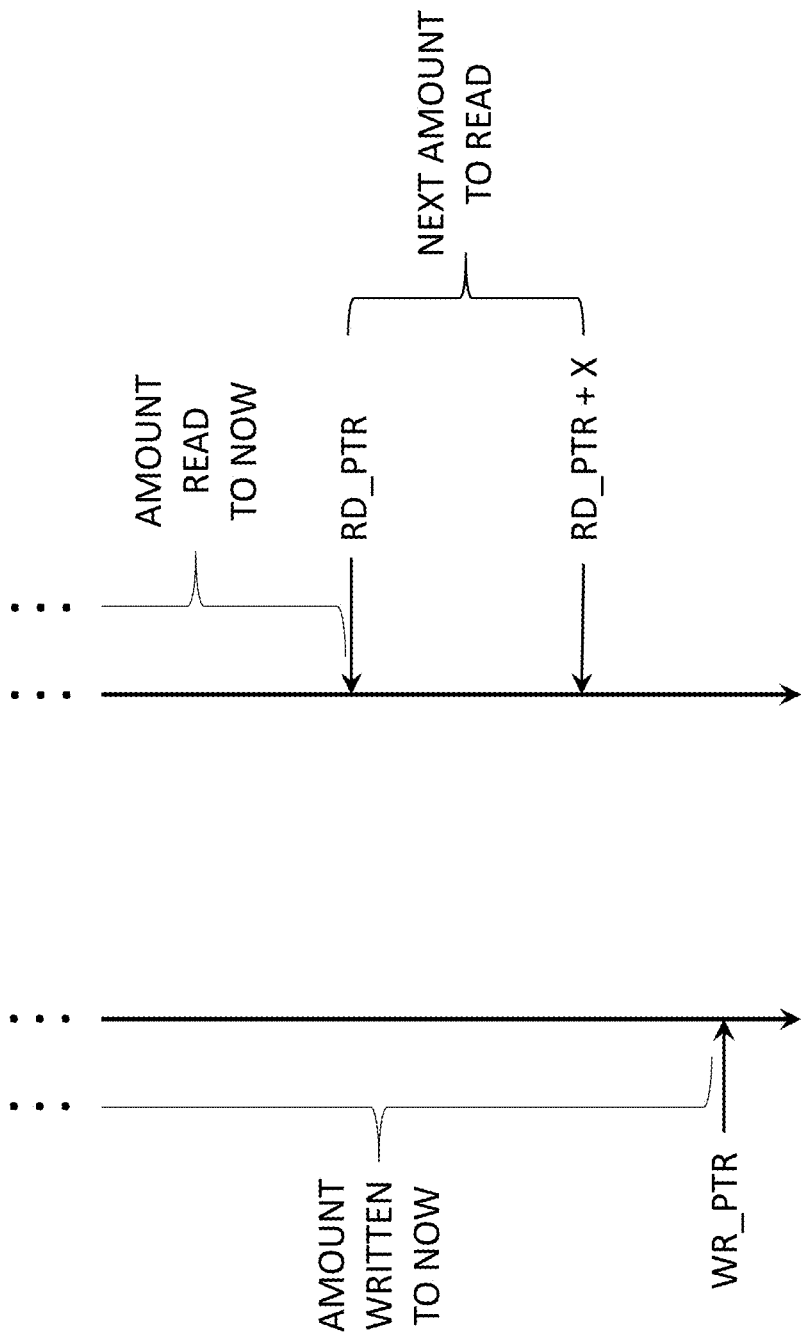

Each line buffer unit model receives its respective simulated input stream from its respective producing model kernel and stores it into a simulated memory resource having, e.g., unlimited capacity. Again, the amount of data transferred per transaction is consistent with the amount of the producing model kernel's original source kernel. As the consuming kernel(s) of the image stream received by the line buffer unit model execute their respective load instructions, they request a next amount of the input image stream from the line buffer unit model consistent with the per transaction amounts of their original source kernels. In response, the line buffer unit model provides the next, requested unit of data from its memory resource As the model of the application software program executes in the simulation environment, each line buffer unit model's respective memory state will ebb and flow with the reading activity from it in response to its consuming kernel(s)'s load instruction requests and the writing activity to it in response to its consuming kernel's store instruction requests. In order to finally determine the memory capacity needs of each line buffer unit, as shown in FIGS. 5a and 5b, each line buffer unit simulation model includes a write pointer and read pointer. The write pointer specifies how much input image data from a producing kernel model has far been written so far into the line buffer unit model's memory. The read pointer specifies how much of the written input image data has so far been read from the line buffer unit model's memory in order to service the load instruction requests from the line buffer unit model's consuming kernel model(s).

The depiction of FIG. 5a indicates that a particular consuming kernel requests X amount of image data per load instruction request (X may correspond, e.g., to a specific number of image lines, to a block size, etc.). That is, with the consuming kernel model having already been sent the amount of data that leads up to the read pointer, the line buffer unit will not be able to service a next load instruction request from the consuming kernel model until the amount of data written into the memory reaches an amount that corresponds to the read pointer+X (that is, until the write pointer points to a value equal to the read pointer+X). As specifically depicted in FIG. 5a, the write pointer has not yet reached this level. As such, if the consuming kernel has already requested the next amount (up to read pointer+X), the consuming kernel is currently stalled waiting for more output data from the producing kernel to be written into the memory. If the consuming kernel has not yet requested the next amount, it is not yet technically stalled and there is still time for the producing kernel to at least provide an amount equal to ((read pointer+X)−write pointer) so that it can be written into the memory before the consuming kernel requests it. This particular event is depicted in FIG. 5b.

The maximum amount of memory capacity needed by a line buffer unit is the maximum observed difference between the read pointer and the write pointer over a sufficiently lengthy simulation runtime execution of the application software program. Thus, determination of the memory capacity for each line buffer unit entails simulating execution of the program for a sufficient number of cycles while continuously tracking the difference between the write pointer and the read pointer and recording each new maximum observed difference. Upon completion of a sufficient number of execution cycles, the remaining recorded maximum observed difference for each line buffer unit model, which corresponds to the maximum difference observed over the entirety of the simulation, corresponds to the memory capacity needed for each line buffer unit.

In various embodiments, in order to avoid an unrealistic condition in which a producer generates output data at a much faster rate than its consumer(s) can consume the output data thereby causing the line buffer unit to continually write to its memory and use its unlimited capacity without bounds, each kernel model also includes a write policy that is enforced at each of its store instructions.

That is, the write policy acts as a check on the amount of line buffer unit memory that is written to with the producing kernel model's output data. Specifically, in an embodiment, a producing kernel's store instruction is not executed until all of the corresponding consuming kernels are stalled (also referred to as "ready"). That is, a producing kernel's load instruction is only permitted to execute if the read pointer+X for each of the consuming kernels is greater than the write pointer for the producing kernel's image stream.

In this state, each of the consuming kernels is stalled (they cannot execute their respective load instruction for their next unit of the producing kernel's image stream because the data has not yet been produced by the producing kernel and written into the line buffer unit memory). As such, the simulation environment is characterized in that producers cannot execute a store instruction for a particular output stream directed to a particular line buffer unit until each of the kernels that consume that output stream from the line buffer unit are stalled at their respective load instruction that will load the next unit of the stream's data from the line buffer unit. Again, although this may be atypical of the runtime behavior of the actual system, it roughly places an upper bound on the amount of memory needed at the line buffer unit (as determined by the maximum observed write pointer to read pointer difference with the write policy in force).

If, e.g., the amount of memory that is actually allocated for each line buffer unit is the same as (or slightly more than) the amount determined from the maximum observed write pointer to read pointer difference, the actual system may never experience any consumer stalls because the producer is often free to execute store instructions at will until the line buffer unit memory is full (at which point, the line buffer unit in the actual system will not permit the producer to send any more data). However, because each producer during simulation was not permitted to execute its store instruction until all its consumers were stalled, the memory allocation as determined through the simulation translates into, for an actual system, a producer generating new data for consumption approximately no later than when its consumers will stall. As such, on average, consumers should not stall in a real system. In this manner, the simulation results essentially determine the minimum memory capacity needed at each line buffer unit.

Ideally, after a sufficient number of simulated runtime cycles the amount of memory to be allocated to each line buffer unit can be determined. However, in various simulation runtime experiences the simulated system may reach total deadlock in which no data is flowing anywhere in the system. That is, all kernels in the system cannot execute a next load instruction because the data has not yet been produced and all producers cannot write a next amount of data (e.g., because their own load instructions have stalled and the producing kernel has no new input to create output data from).

If the system reaches total deadlock as described above, the system state is analyzed and a deadlock cycle is found. A deadlock cycle is a closed loop within the data flow of the application that includes a particular stalled load that is waiting for a particular store to execute, but the particular store cannot execute because it is waiting for the stalled load to execute (note that the stalled load and stalled store do not have to be associated with kernels that directly communicate with one another).

For example, in the simulation model of the software program of FIG. 3, the load instruction of the model for kernel for K4 that reads data from line buffer unit 304_4 may be waiting for data to be produced by kernel K3. The stall of this particular load essentially stalls all of kernel K4 which therefore prevents the load instruction of K4 that reads from line buffer 304_2 from executing. If the state of line buffer 304_2 is such that the write pointer is ahead of the read pointer+X (e.g., because K1 writes large data units in line buffer 304_2), the store instruction of K1 that writes into line buffer 304_2 will stall which stalls all of K1 including the store instruction that writes into line buffer 304_1.

Because line buffer 304_1 is not being written to, K3 is stalled which completes the identification analysis of the deadlock cycle. That is, the deadlock cycle runs: 1) from K1 through line buffer unit 304_1 to kernel K3; 2) from kernel K3 through line buffer unit 304_4 to kernel K4; and, 3) from kernel K4 through line buffer 304_2 back to kernel K1. With this particular deadlock cycle being in existence, K2 will also stall resulting in total deadlock of the entire system (and which also creates more deadlock cycles within the system). In an embodiment, once a deadlock cycle has been identified, a stalled store instruction along the cycle is permitted to advance one data unit forward in hopes the advancement will "kick start" the system back to operation. For example, if the store instruction of kernel K1 that writes into line buffer unit 304_1 is advanced one data unit forward, it could be enough to cause the execution of the stalled load instruction of kernel K3, which, in turn, could cause the system to begin operating again.

In an embodiment, only one stalled store instruction along the deadlock cycle is permitted to advance one unit forward. If the advancement does not cause the system to begin operating again, another store instruction along the deadlock cycle is chosen for advancement. The process of selecting one store instruction at a time for advancement continues until the system begins operation or remains in total deadlock after all store instructions along the deadlock cycle have been permitted to advance one data unit forward. If the later condition is reached (system remains in total deadlock), one of the writers along the deadlock cycle is chosen and permitted to write freely in hopes that the system will begin operation again. If the system does not begin operation, another store instruction along the deadlock cycle is chosen and permitted to write freely, etc. Eventually, the system should begin operation.

In various embodiments, producing/consuming kernel models may send/read image data to/from their respective line buffer unit models according to different transport modes. According to a first mode, referred to as "full line group", a number of same width lines of image data are transported between a kernel model and a line buffer unit model.

Figure 6A:
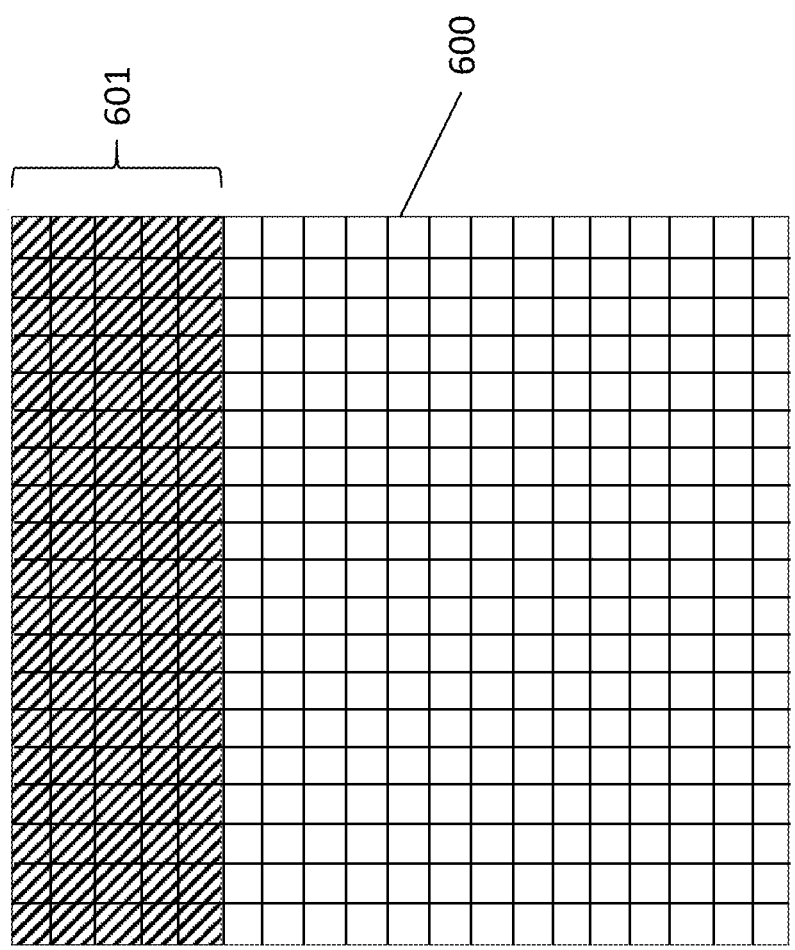
Figure 6B:
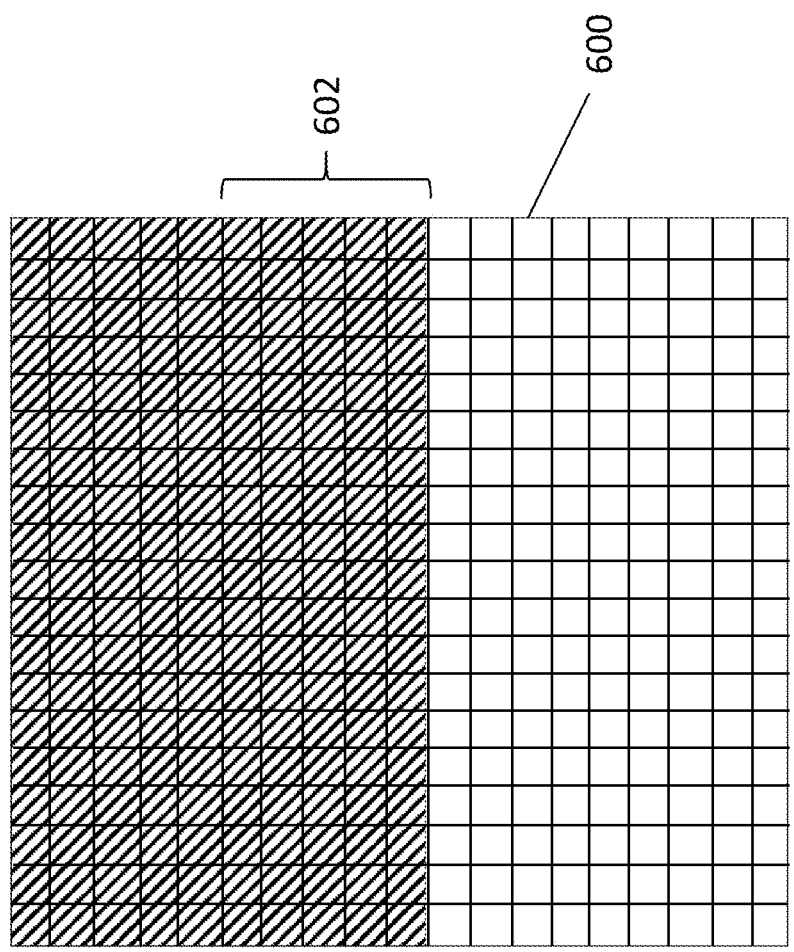

FIGS. 6a and 6b depict an embodiment of full line group mode operation. As observed in FIG. 6a, image region 600 corresponds to a full frame of image data or a section of a full frame of image data (the reader will understand the depicted matrix shows different pixel locations of the overall image). As depicted in FIG. 6a, and first transfer (e.g., a first packet) of image data sent between a kernel model and line buffer unit model contains a first group of same width image lines 601 that fully extend across the frame being transferred to section of a frame being transferred 600. Then, as depicted in FIG. 6b, a second transfer contains a second group of same width image lines 602 that fully extend across the frame or section thereof 600.

Here, the transfer of group 601 of FIG. 6a would advance the write and/or read pointers of the line buffer unit model one unit forward. Likewise, the transfer of group 602 of FIG. 6b would advance the write and/or read pointers of the line buffer unit model another unit forward. As such, the write pointer and read pointer behaviors described above with respect to FIGS. 5a and 5b are consistent with the full line group mode.

Another transfer mode, referred to as "virtually tall", can be used to transfer blocks of image data (two-dimensional surface areas of image data). Here, as discussed above with respect to FIG. 1 and as elaborated on in more detail below, in various embodiments, the one or more processing cores of the overall image processor each include a two-dimensional execution lane array and a two-dimensional shift register array. As such, the register space of a processing core is loaded with entire blocks of image data (rather than mere scalar or single vector values).

Figure 6C:
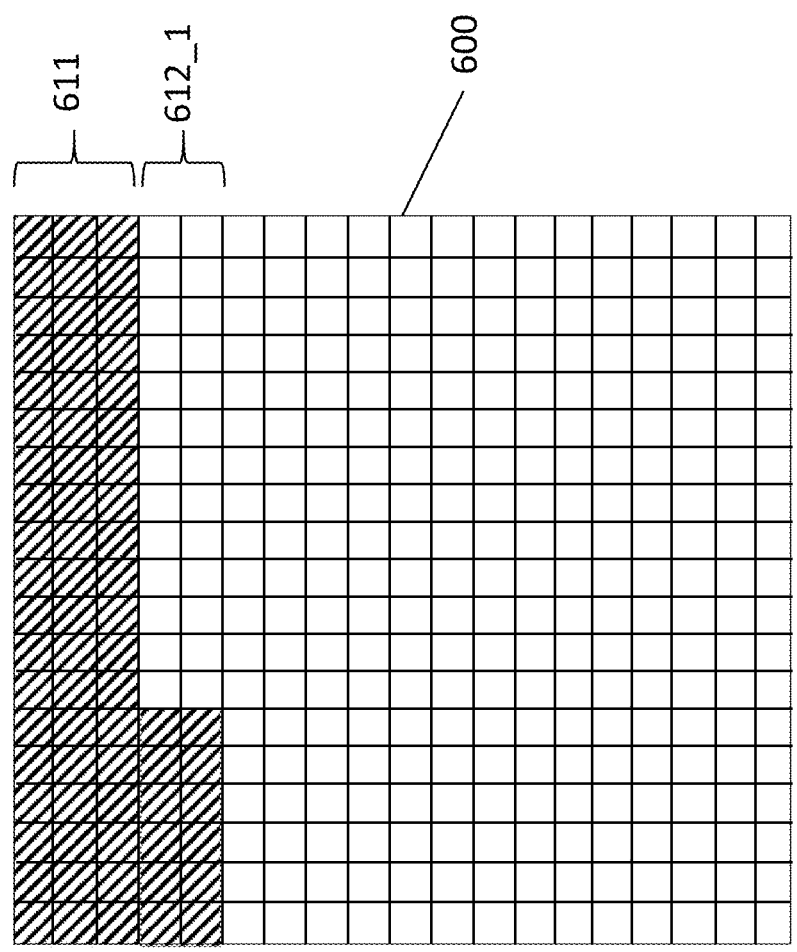
Figure 6D:
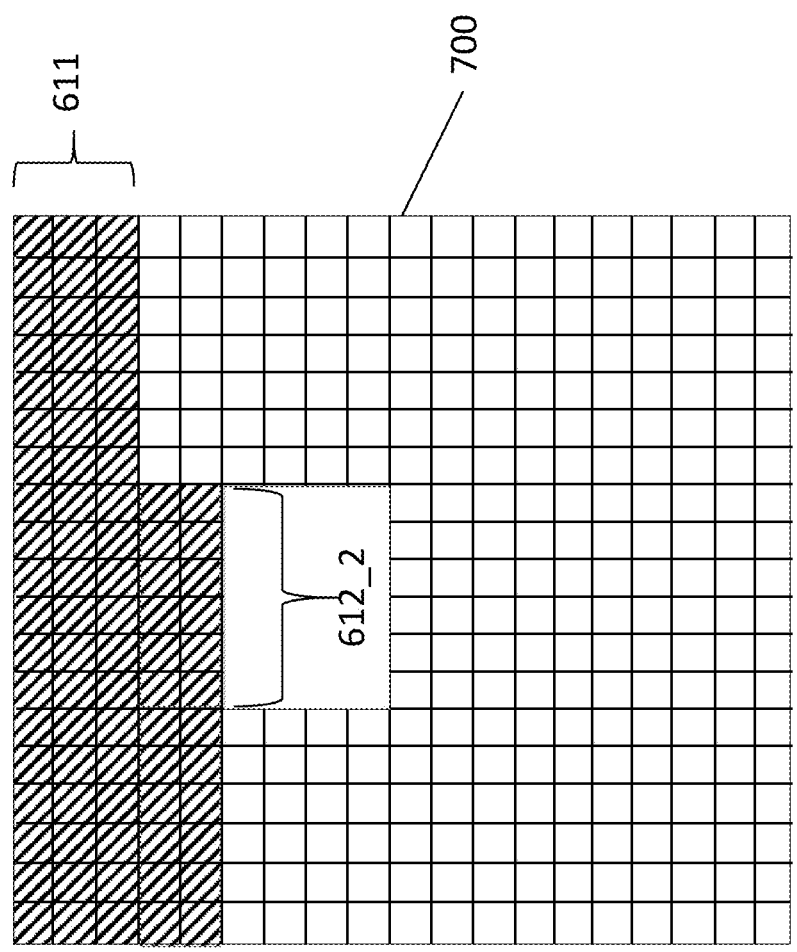

Consistent with the two-dimensional nature of the data units that are processed by the processing cores, the virtually tall mode is able to transfer blocks of image data as depicted in FIGS. 6c and 6d. Referring to FIG. 6c, initially a smaller height full width line group is transferred 611, e.g., from a first producing kernel model to a line buffer unit model. From that point forward, at least for image area 600, the image data is transferred from the producing kernel model to the line buffer unit model in smaller width line groups 612_1, 612_2, etc.

Here, smaller width line group 612_1 is transferred, e.g., in a second producing kernel model to line buffer unit model transaction. Then, as observed in FIG. 6d, a next smaller width line group 612_2 is transferred, e.g., in a third producing kernel model to line buffer unit model transaction. As such, the line buffer unit model write pointer is initially incremented by a large value (to represent the transfer of full line group 611) but is then incremented by smaller values (e.g., a first smaller value to represent the transfer of smaller width line group 612_1 and then gain by a next smaller value to represent the transfer of smaller width line group 612_2).

As described above, FIGS. 6c and 6d show the writing of content sent by a producing kernel model into the line buffer unit model memory. The consuming kernel model may be configured to also receive the image data as described above (in which case the read pointer behavior is the same as the write pointer behavior described just above), or, receive blocks of image data as the blocks of image data are formed in line buffer memory.

That is, with respect to the later, the consuming kernel model is not initially sent the first full line group 611. Instead the consuming kernel model is initially sent a data amount that corresponds to a first 5×5 array of pixel values whose bottom edge is outlined by the bottom edge of smaller width line group 612_1 after the first smaller line width line group 612_1 is written into the line buffer memory. Then, the consuming model is sent a second 5×5 array of pixel values whose bottom edge is outlined by reference 612_2 after the second smaller line width line group 612_2 is written into the line buffer memory. In the case of block transfers to the consuming kernel model as described just above, as depicted in FIG. 6e, the next amount to be transferred includes a smaller piece of data that has been more recently written into the line buffer memory and a larger piece of data that was written into the line buffer memory some time ago.

Figure 7:
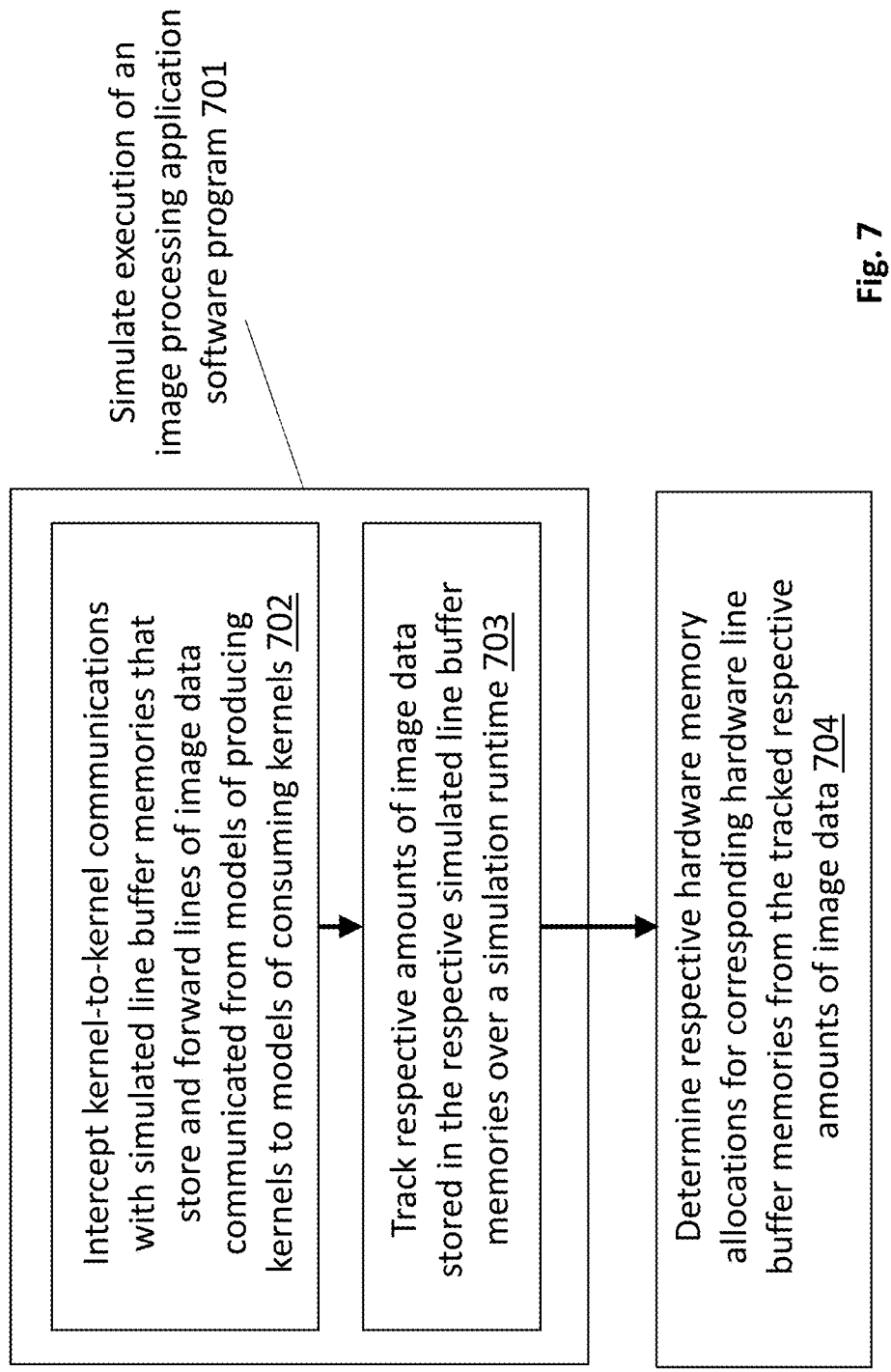
FIG. 7 shows a method for determining per line buffer unit memory allocation.

FIG. 7 shows a method described above for determining per line buffer unit memory allocation. The method includes simulating execution of an image processing application software program 701. The simulating includes intercepting 702 kernel-to-kernel communications with models of line buffer memories that store and forward lines of image data communicated from models of producing kernels to models of consuming kernels. The simulating further includes tracking 703 respective amounts of image data stored in the respective simulated line buffer memories over a simulation runtime. The method also includes determining 704 respective hardware memory allocations for corresponding hardware line buffer memories from the tracked respective amounts of image data.

The determining of the hardware memory allocation from the tracked observance of the simulated line buffer memory storage states can be implemented at least in part, by scaling the simulated line buffer memories in view of one another. For example, if a first simulated line buffer memory demonstrated a maximum write-to-read pointer difference that was twice that of a second simulated line buffer memory, the corresponding actual hardware memory allocation for the first hardware line buffer unit would be approximately twice that of the corresponding actual hardware memory allocation for the second hardware line buffer unit. The remaining allocations would be scaled accordingly.

After the memory allocations have been determined for the application software program, the application software program may be configured with configuration information to run on the target image processor, where, the configuration information informs the image processor's hardware how much line buffer unit memory space is allocated to respective hardware line buffer units according to the determinations made from the simulation. The configuration information may also include, e.g., assigning kernels to execute on certain stencil processors of the image processor and to produce to and consume from certain hardware line buffer units. The corpus of configuration information that is generated for the application may then, e.g., be loaded into configuration register space and/or configuration memory resources of the image processor to "setup" the image processor hardware to execute the application.

In various embodiments, the aforementioned line buffer units may more generally be characterized as buffers that store and forward image data between producing and consuming kernels. That is, in various embodiments, a buffer need not necessarily queue line groups. Additionally, the hardware platform of the image processor may include a plurality of line buffer units having associated memory resources and one or more line buffers may be configured to operate from a single line buffer unit. That is, a single line buffer unit in hardware may be configured to store and forward different image data flows between different producing/consuming kernel pairs.

In various embodiments, the actual kernels may be simulated during the simulation rather than simulating models of them. Further still, the image data that is transported between kernels and line buffer units during simulation may be representations of image data (e.g., a number of lines where each line is understood to correspond to a certain data size). For simplicity, the term image data should be understood to apply to actual image data or a representation of image data.

3.0 Image Processor Implementation Embodiments

FIGS. 8a-e through FIG. 12 provide additional details concerning operation and design of various embodiments for the image processor and associated stencil processor described at length above. Recalling from the discussion of FIG. 2 that a line buffer unit feeds line groups to a stencil processor's associated sheet generator, FIGS. 8a through 8e illustrate at a high level embodiments of both the parsing activity of a line buffer unit 201, the finer grained parsing activity of a sheet generator unit 203 as well as the stencil processing activity of the stencil processor 702 that is coupled to the sheet generator unit 203.

FIG. 8a depicts an embodiment of an input frame of image data 801. FIG. 8a also depicts an outline of three overlapping stencils 802 (each having a dimension of 3 pixels×3 pixels) that a stencil processor is designed to operate over. The output pixel that each stencil respectively generates output image data for is highlighted in solid black. For simplicity, the three overlapping stencils 802 are depicted as overlapping only in the vertical direction. It is pertinent to recognize that in actuality a stencil processor may be designed to have overlapping stencils in both the vertical and horizontal directions.

Because of the vertical overlapping stencils 802 within the stencil processor, as observed in FIG. 8a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 201 is responsible for parsing a line group of input image data from an incoming frame that is sufficient for the stencil processors to operate over for an extended number of upcoming cycles. An exemplary depiction of a line group is illustrated as a shaded region 803. In an embodiment, the line buffer unit 201 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 803 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Figure 8C:
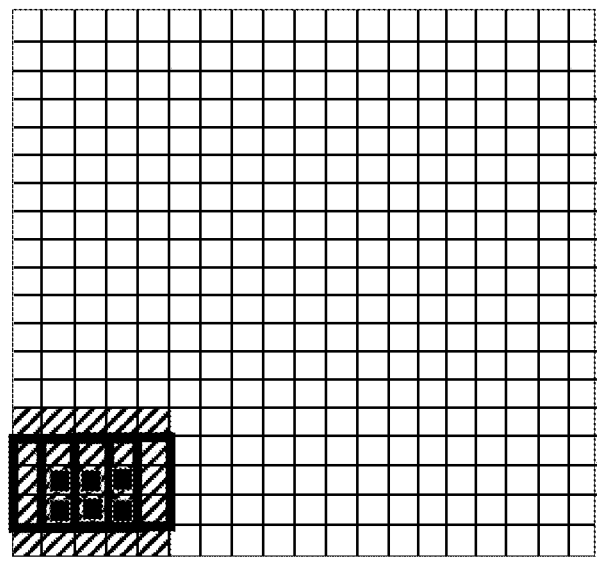
Figure 8D:
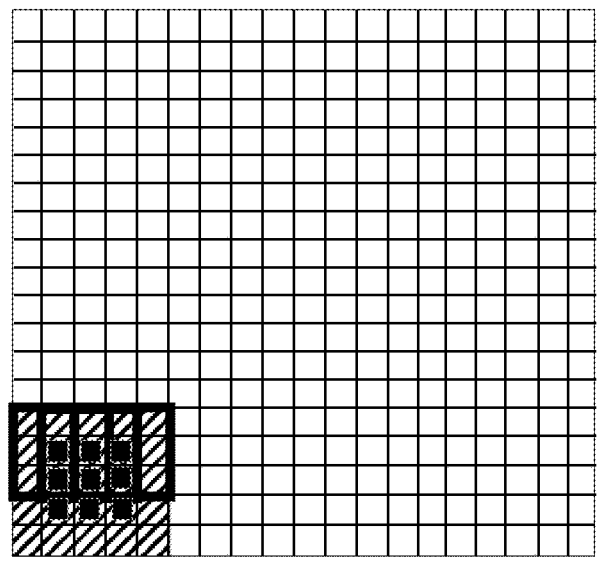

Thus, as observed in FIG. 8b, the sheet generator parses an initial sheet 804 from the line group 803 and provides it to the stencil processor (here, the sheet of data corresponds to the shaded region that is generally identified by reference number 804). As observed in FIGS. 8c and 8d, the stencil processor operates on the sheet of input image data by effectively moving the overlapping stencils 802 in a left to right fashion over the sheet. As of FIG. 8d, the number of pixels for which an output value could be calculated from the data within the sheet is exhausted (no other pixel positions can have an output value determined from the information within the sheet). For simplicity the border regions of the image have been ignored.

As observed in FIG. 8e the sheet generator then provides a next sheet 805 for the stencil processor to continue operations on. Note that the initial positions of the stencils as they begin operation on the next sheet is the next progression to the right from the point of exhaustion on the first sheet (as depicted previously in FIG. 8d). With the new sheet 805, the stencils will simply continue moving to the right as the stencil processor operates on the new sheet in the same manner as with the processing of the first sheet.

Note that there is some overlap between the data of the first sheet 804 and the data of the second sheet 805 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

Figure 9A:
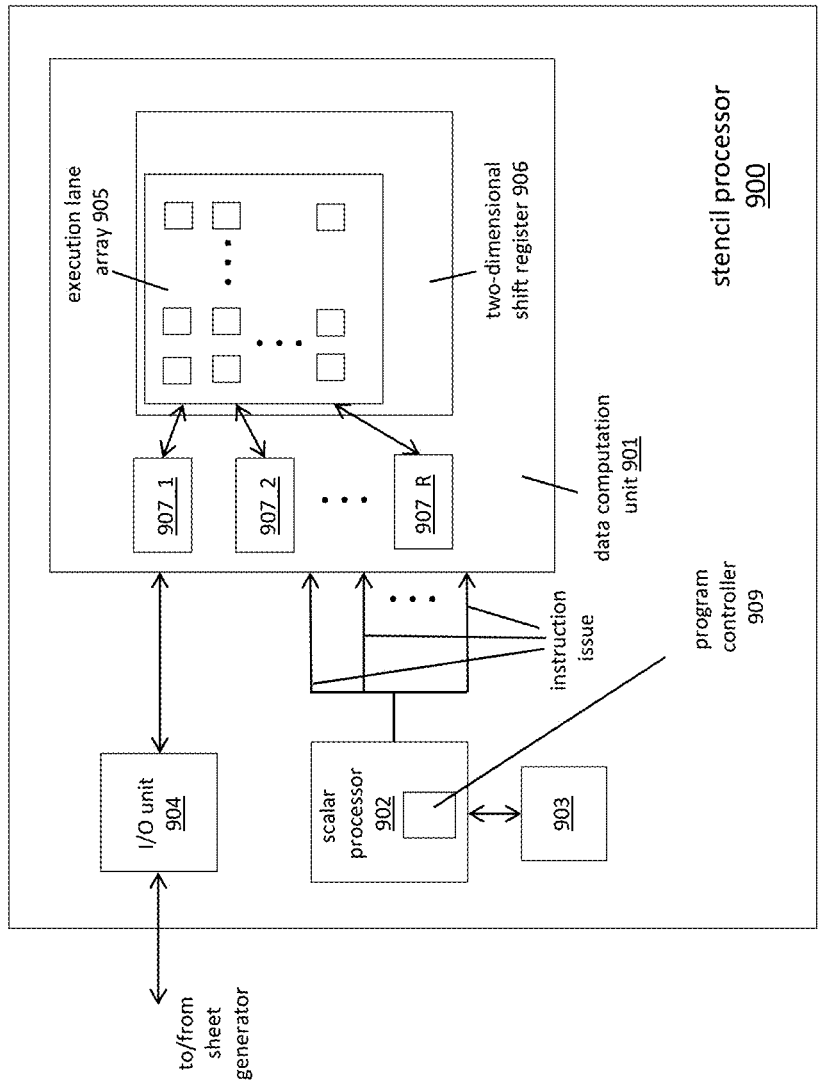
FIG. 9a shows an embodiment of a stencil processor.

FIG. 9a shows an embodiment of a stencil processor architecture 900. As observed in FIG. 9a, the stencil processor includes a data computation unit 901, a scalar processor 902 and associated memory 903 and an I/O unit 904. The data computation unit 901 includes an array of execution lanes 905, a two-dimensional shift array structure 906 and separate random access memories 907 associated with specific rows or columns of the array.

The I/O unit 904 is responsible for loading "input" sheets of data received from the sheet generator into the data computation unit 901 and storing "output" sheets of data from the stencil processor into the sheet generator. In an embodiment the loading of sheet data into the data computation unit 901 entails parsing a received sheet into rows/columns of image data and loading the rows/columns of image data into the two dimensional shift register structure 906 or respective random access memories 907 of the rows/columns of the execution lane array (described in more detail below). If the sheet is initially loaded into memories 907, the individual execution lanes within the execution lane array 905 may then load sheet data into the two-dimensional shift register structure 906 from the random access memories 907 when appropriate (e.g., as a load instruction just prior to operation on the sheet's data). Upon completion of the loading of a sheet of data into the register structure 906 (whether directly from a sheet generator or from memories 907), the execution lanes of the execution lane array 905 operate on the data and eventually "write back" finished data as a sheet directly back to the sheet generator, or, into the random access memories 907. If the later the I/O unit 904 fetches the data from the random access memories 907 to form an output sheet which is then forwarded to the sheet generator.

The scalar processor 902 includes a program controller 909 that reads the instructions of the stencil processor's program code from scalar memory 903 and issues the instructions to the execution lanes in the execution lane array 905. In an embodiment, a single same instruction is broadcast to all execution lanes within the array 905 to effect a SIMD-like behavior from the data computation unit 901. In an embodiment, the instruction format of the instructions read from scalar memory 903 and issued to the execution lanes of the execution lane array 905 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 905).

The combination of an execution lane array 905, program controller 909 and two dimensional shift register structure 906 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 905, the random access memories 907 may also keep one or more look-up tables. In various embodiments one or more scalar look-up tables may also be instantiated within the scalar memory 903.

A scalar look-up involves passing the same data value from the same look-up table from the same index to each of the execution lanes within the execution lane array 905. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 905 during the same clock cycle. Additional details concerning use and operation of look-up tables is provided further below.

FIG. 9b summarizes the VLIW instruction word embodiments(s) discussed above. As observed in FIG. 9b, the VLIW instruction word format includes fields for three separate instructions: 1) a scalar instruction 951 that is executed by the scalar processor; 2) an ALU instruction 952 that is broadcasted and executed in SIMD fashion by the respective ALUs within the execution lane array; and, 3) a memory instruction 953 that is broadcasted and executed in a partial SIMD fashion (e.g., if execution lanes along a same row in the execution lane array share a same random access memory, then one execution lane from each of the different rows actually execute the instruction (the format of the memory instruction 953 may include an operand that identifies which execution lane from each row executes the instruction).

A field 954 for one or more immediate operands is also included. Which of the instructions 951, 952, 953 use which immediate operand information may be identified in the instruction format. Each of instructions 951, 952, 953 also include their own respective input operand and resultant information (e.g., local registers for ALU operations and a local register and a memory address for memory access instructions). In an embodiment, the scalar instruction 951 is executed by the scalar processor before the execution lanes within the execution lane array execute either of the other instructions 952, 953. That is, the execution of the VLIW word includes a first cycle upon which the scalar instruction 951 is executed followed by a second cycle upon with the other instructions 952, 953 may be executed (note that in various embodiments instructions 952 and 953 may be executed in parallel).

In an embodiment, the scalar instructions executed by the scalar processor include commands issued to the sheet generator to load/store sheets from/into the memories or 2D shift register of the data computation unit. Here, the sheet generator's operation can be dependent on the operation of the line buffer unit or other variables that prevent pre-runtime comprehension of the number of cycles it will take the sheet generator to complete any command issued by the scalar processor. As such, in an embodiment, any VLIW word whose scalar instruction 951 corresponds to or otherwise causes a command to be issued to the sheet generator also includes no-operation (NOOP) instructions in the other two instruction field 952, 953. The program code then enters a loop of NOOP instructions for instruction fields 952, 953 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 10:
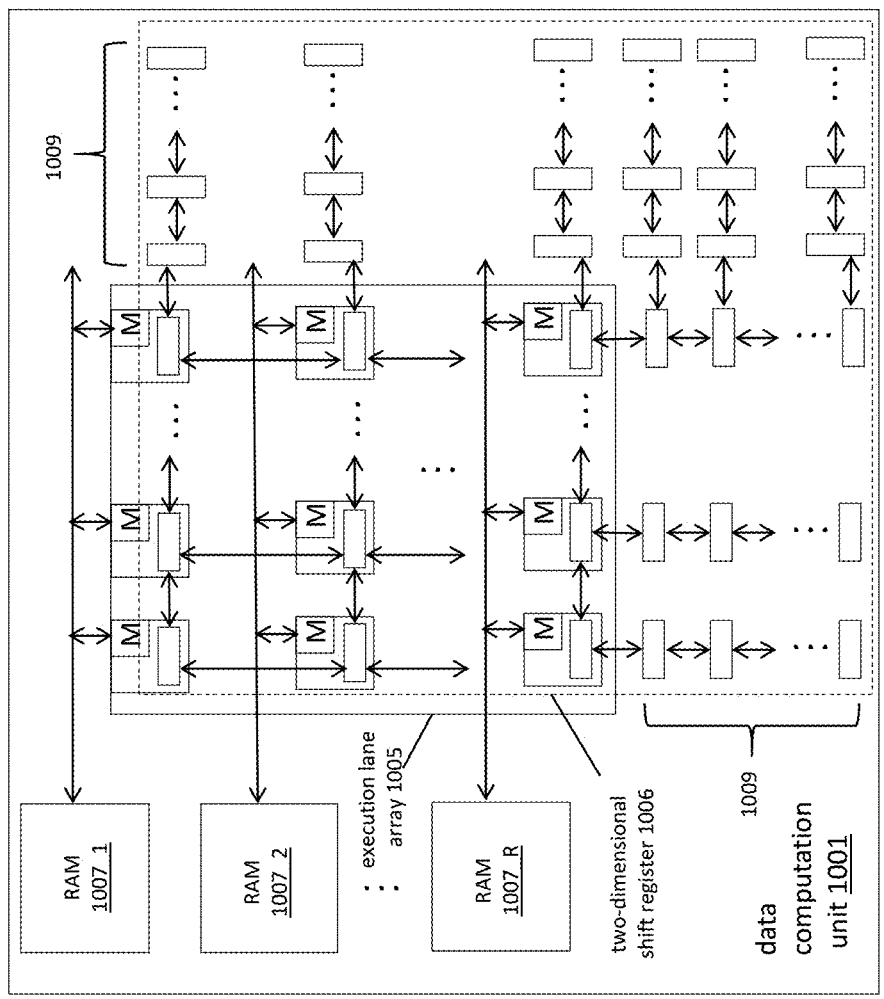
FIG. 10 shows an embodiment of a data computation unit within a stencil processor.

FIG. 10 shows an embodiment of a data computation component 1001. As observed in FIG. 10, the data computation component 1001 includes an array of execution lanes 1005 that are logically positioned "above" a two-dimensional shift register array structure 1006. As discussed above, in various embodiments, a sheet of image data provided by a sheet generator is loaded into the two-dimensional shift register 1006. The execution lanes then operate on the sheet data from the register structure 1006.

The execution lane array 1005 and shift register structure 1006 are fixed in position relative to one another. However, the data within the shift register array 1006 shifts in a strategic and coordinated fashion to cause each execution lane in the execution lane array to process a different stencil within the data. As such, each execution lane determines the output image value for a different pixel in the output sheet being generated. From the architecture of FIG. 10 it should be clear that overlapping stencils are not only arranged vertically but also horizontally as the execution lane array 1005 includes vertically adjacent execution lanes as well as horizontally adjacent execution lanes.

Some notable architectural features of the data computation unit 1001 include the shift register structure 1006 having wider dimensions than the execution lane array 1005. That is, there is a "halo" of registers 1009 outside the execution lane array 1005. Although the halo 1009 is shown to exist on two sides of the execution lane array, depending on implementation, the halo may exist on less (one) or more (three or four) sides of the execution lane array 1005. The halo 1005 serves to provide "spill-over" space for data that spills outside the bounds of the execution lane array 1005 as the data is shifting "beneath" the execution lanes 1005. As a simple case, a 5×5 stencil centered on the right edge of the execution lane array 1005 will need four halo register locations further to the right when the stencil's leftmost pixels are processed. For ease of drawing, FIG. 10 shows the registers of the right side of the halo as only having horizontal shift connections and registers of the bottom side of the halo as only having vertical shift connections when, in a nominal embodiment, registers on either side (right, bottom) would have both horizontal and vertical connections. In various embodiments, the halo region does not include corresponding execution lane logic to execute image processing instructions (e.g., no ALU is present). However, individual memory access units (M) are present in each of the halo region locations so that the individual halo register locations can individually load data from memory and store data to memory.

Additional spill-over room is provided by random access memories 1007 that are coupled to each row and/or each column in the array, or portions thereof (E.g., a random access memory may be assigned to a "region" of the execution lane array that spans 4 execution lanes row wise and 2 execution lanes column wise. For simplicity the remainder of the application will refer mainly to row and/or column based allocation schemes). Here, if an execution lane's kernel operations require it to process pixel values outside of the two-dimensional shift register array 1006 (which some image processing routines may require) the plane of image data is able to further spill-over, e.g., from the halo region 1009 into random access memory 1007. For example, consider a 6×6 stencil where the hardware includes a halo region of only four storage elements to the right of an execution lane on the right edge of the execution lane array. In this case, the data would need to be shifted further to the right off the right edge of the halo 1009 to fully process the stencil. Data that is shifted outside the halo region 1009 would then spill-over to random access memory 1007. Other applications of the random access memories 1007 and the stencil processor of FIG. 9a are provided further below.

FIGS. 11a through 11k demonstrate a working example of the manner in which image data is shifted within the two dimensional shift register array "beneath" the execution lane array as alluded to above. As observed in FIG. 11a, the data contents of the two dimensional shift array are depicted in a first array 1107 and the execution lane array is depicted by a frame 1105. Also, two neighboring execution lanes 1110 within the execution lane array are simplistically depicted. In this simplistic depiction 1110, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 11a through 11k depict one of these deeper register locations as being used to store the resultant X from the respective execution lanes. For illustrative ease the deeper resultant register is drawn alongside rather than beneath its counterpart register R2.

FIGS. 11a through 11k focus on the calculation of two stencils whose central position is aligned with the pair of execution lane positions 1111 depicted within the execution lane array. For ease of illustration, the pair of execution lanes 1110 are drawn as horizontal neighbors when in fact, according to the following example, they are vertical neighbors.

Figure 11A:
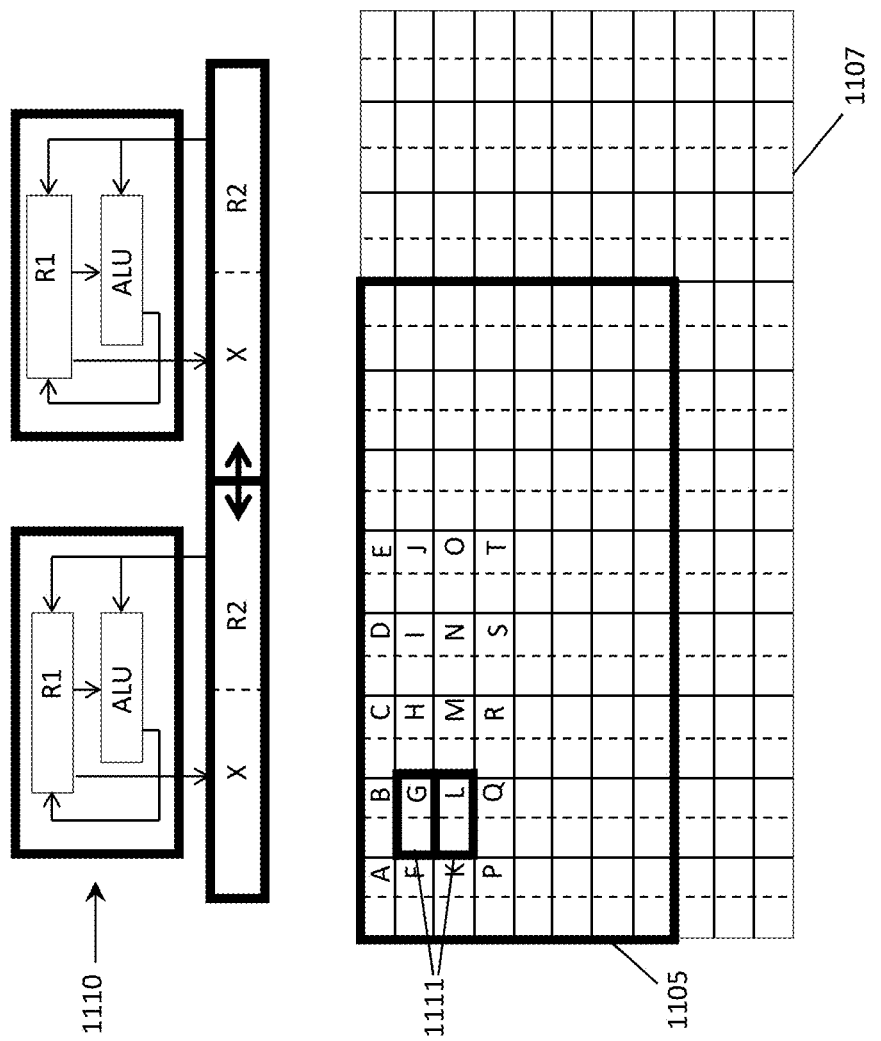
FIGS. 11a, 11b, 11c, 11d, 11e, 11f, 11g, 11h, 11i, 11j and 11k depict an example of the use of a two-dimensional shift array and an execution lane array to determine a pair of neighboring output pixel values with overlapping stencils.
Figure 11B:
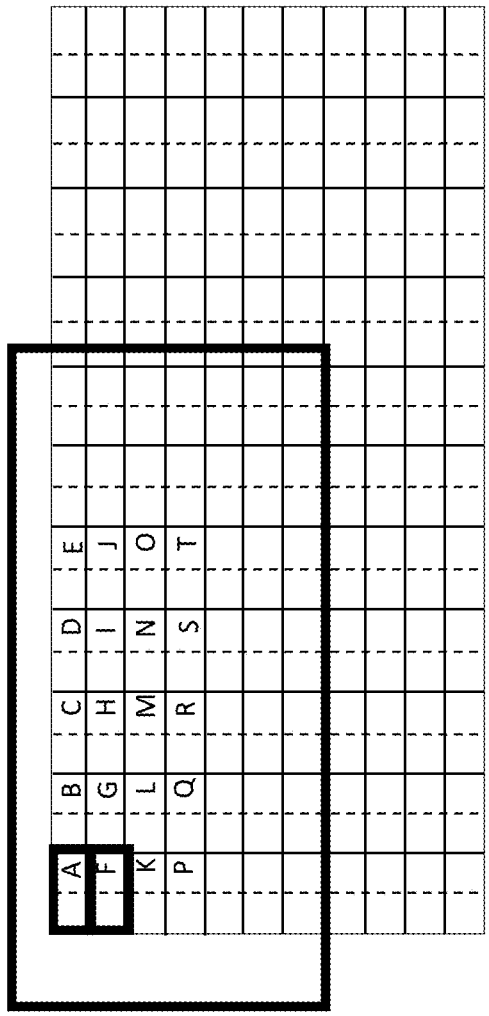

As observed initially in FIG. 11a, the execution lanes are centered on their central stencil locations. FIG. 11b shows the object code executed by both execution lanes. As observed in FIG. 11b the program code of both execution lanes causes the data within the shift register array to shift down one position and shift right one position. This aligns both execution lanes to the upper left hand corner of their respective stencils. The program code then causes the data that is located (in R2) in their respective locations to be loaded into R1.

Figure 11C:
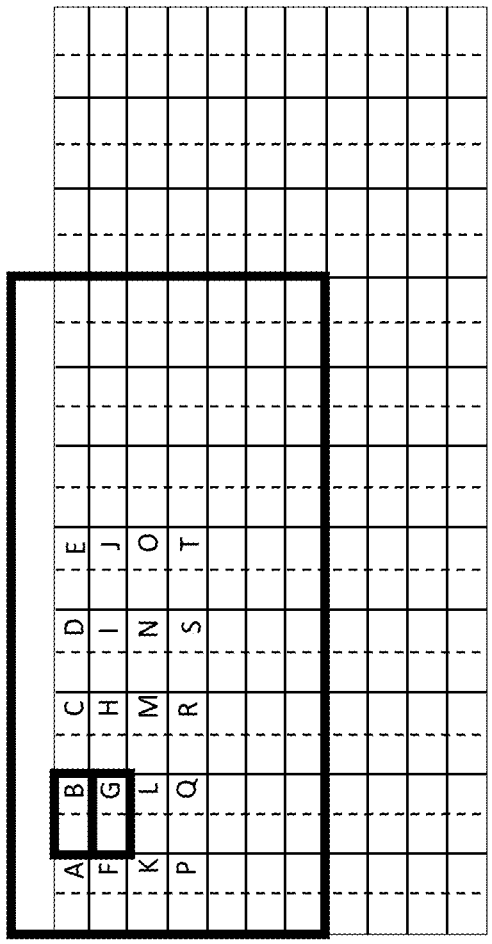
Figure 11D:
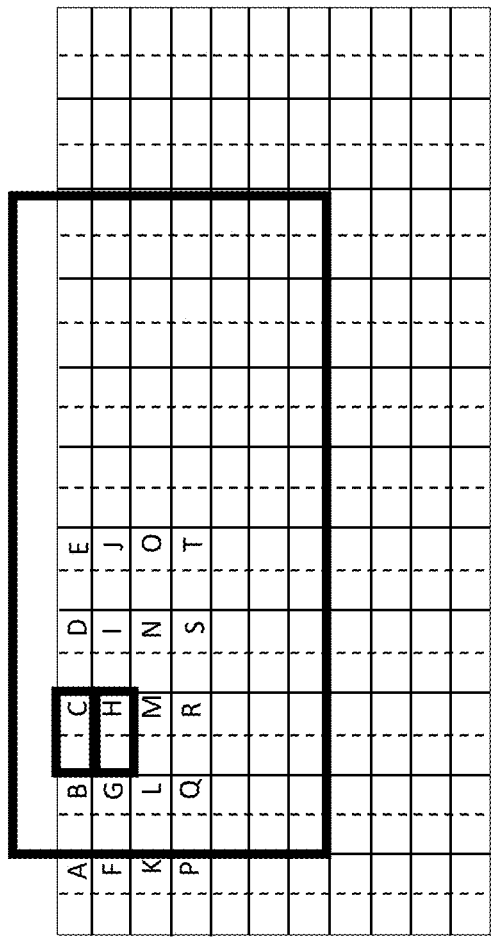

As observed in FIG. 11c the program code next causes the pair of execution lanes to shift the data within the shift register array one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 11d the same process as described above for FIG. 11c is repeated which causes the resultant R1 to now include the value A+B+C in the upper execution lane and F+G+H in the lower execution lane. At this point both execution lanes have processed the upper row of their respective stencils. Note the spill-over into a halo region on the left side of the execution lane array (if one exists on the left hand side) or into random access memory if a halo region does not exist on the left hand side of the execution lane array.

Figure 11E:
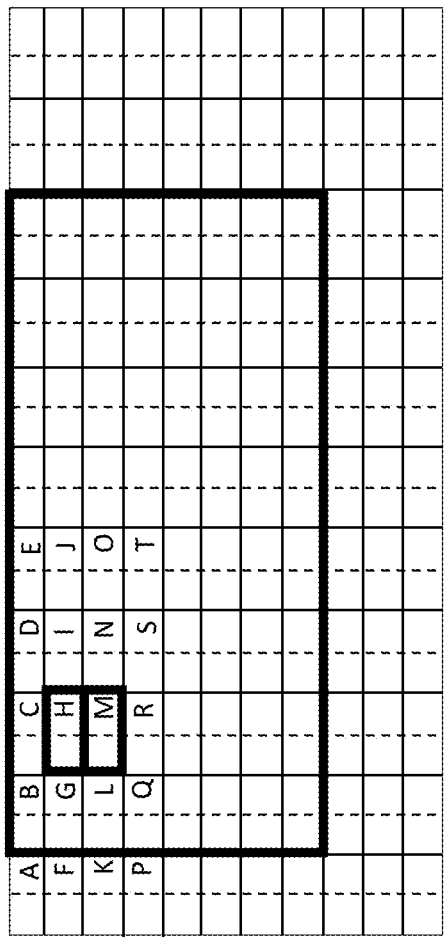
Figure 11F:
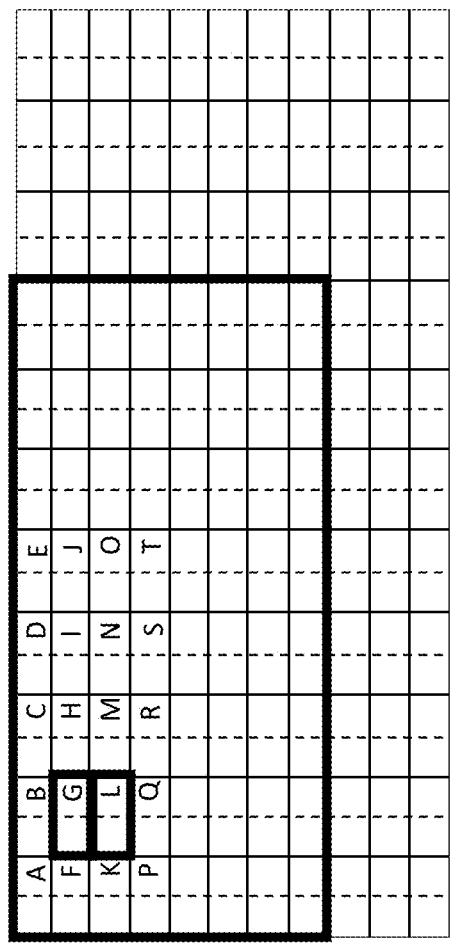
Figure 11G:
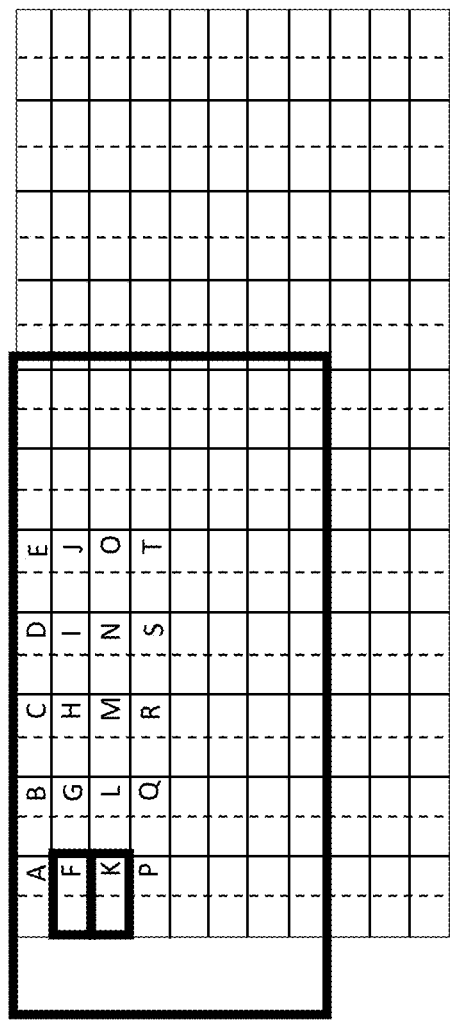

As observed in FIG. 11e, the program code next causes the data within the shift register array to shift one unit up which causes both execution lanes to be aligned with the right edge of the middle row of their respective stencils. Register R1 of both execution lanes currently includes the summation of the stencil's top row and the middle row's rightmost value. FIGS. 11f and 11g demonstrate continued progress moving leftwise across the middle row of both execution lane's stencils. The accumulative addition continues such that at the end of processing of FIG. 11g both execution lanes include the summation of the values of the top row and the middle row of their respective stencils.

Figure 11H:
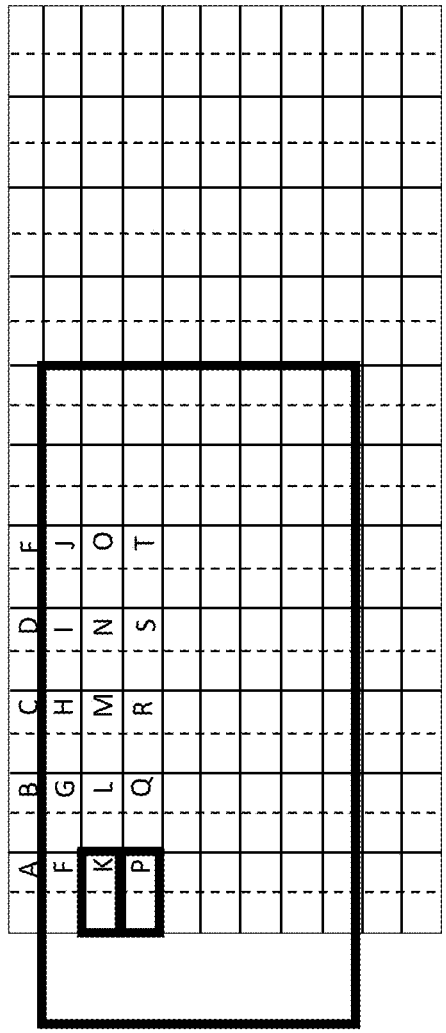
Figure 11I:
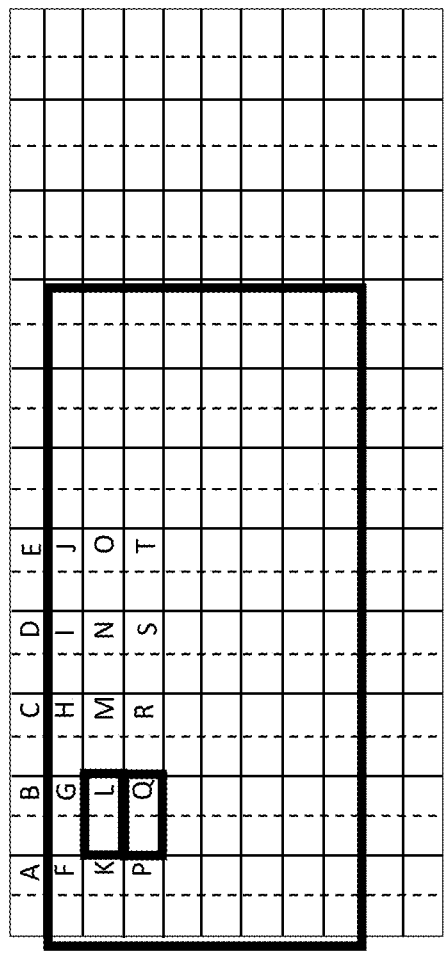
Figure 11J:
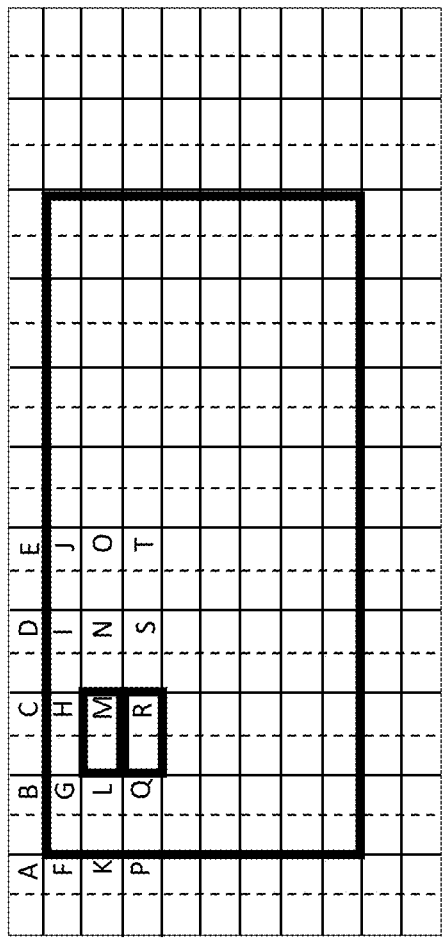
Figure 11K:
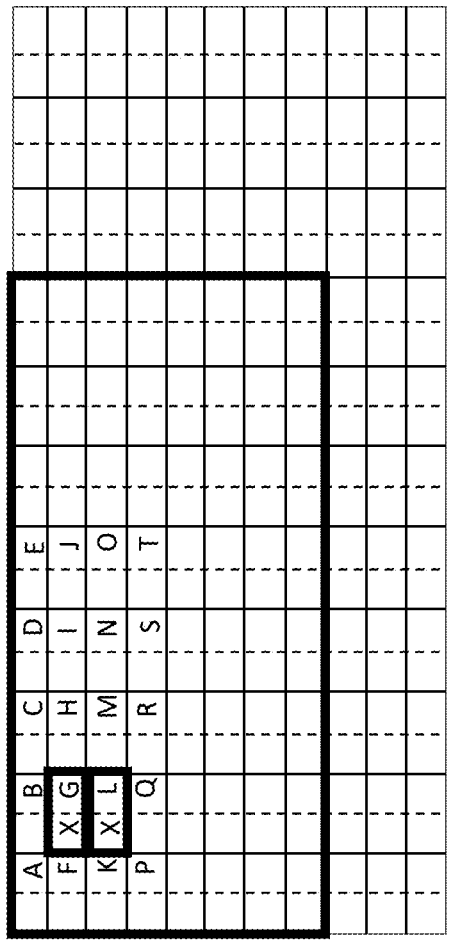

FIG. 11h shows another shift to align each execution lane with its corresponding stencil's lowest row. FIGS. 11i and 11j show continued shifting to complete processing over the course of both execution lanes' stencils. FIG. 11k shows additional shifting to align each execution lane with its correct position in the data array and write the resultant thereto.

In the example of FIGS. 11a-11k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

FIG. 12 shows another, more detailed depiction of the unit cell for an execution lane and corresponding shift register structure (registers in the halo region do not include a corresponding execution lane but do include a memory unit in various embodiments). The execution lane and the register space associated with each location in the execution lane array is, in an embodiment, implemented by instantiating the circuitry observed in FIG. 12 at each node of the execution lane array. As observed in FIG. 12, the unit cell includes an execution lane 1201 coupled to a register file 1202 consisting of four registers R2 through R5. During any cycle, the execution lane 1201 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 1203, and, having the contents of any of (only) one of registers R2 through R4 replaced with content that is shifted "in" from a corresponding one if its neighbors through input multiplexers 1204 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 1203, 1204 permits for different shift source and shift target registers within a same register file during a same cycle.

As depicted in FIG. 12 note that during a shift sequence an execution lane will shift content out from its register file 1202 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 1203, 1204 observed in FIG. 12 is incorporated into the design of FIG. 12. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of an execution lane's register files are shifted out during a shift sequence note that the content of the non shifted out registers of each execution lane remain in place (do not shift). As such, any non shifted content that is not replaced with shifted in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 1201, in various embodiments, the mathematical opcodes supported by the hardware ALU include (e.g., ADD, SUB, MOV, MUL, MAD, ABS, DIV, SHL, SHR, MIN/MAX, SEL, AND, OR, XOR, NOT). As described just above, memory access instructions can be executed by the execution lane 1201 to fetch/store data from/to their associated random access memory. Additionally the hardware execution lane 1201 supports shift op instructions (right, left, up, down) to shift data within the two dimensional shift register structure. As described above, program control instructions are largely executed by the scalar processor of the stencil processor.

4.0 Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

Figure 13:
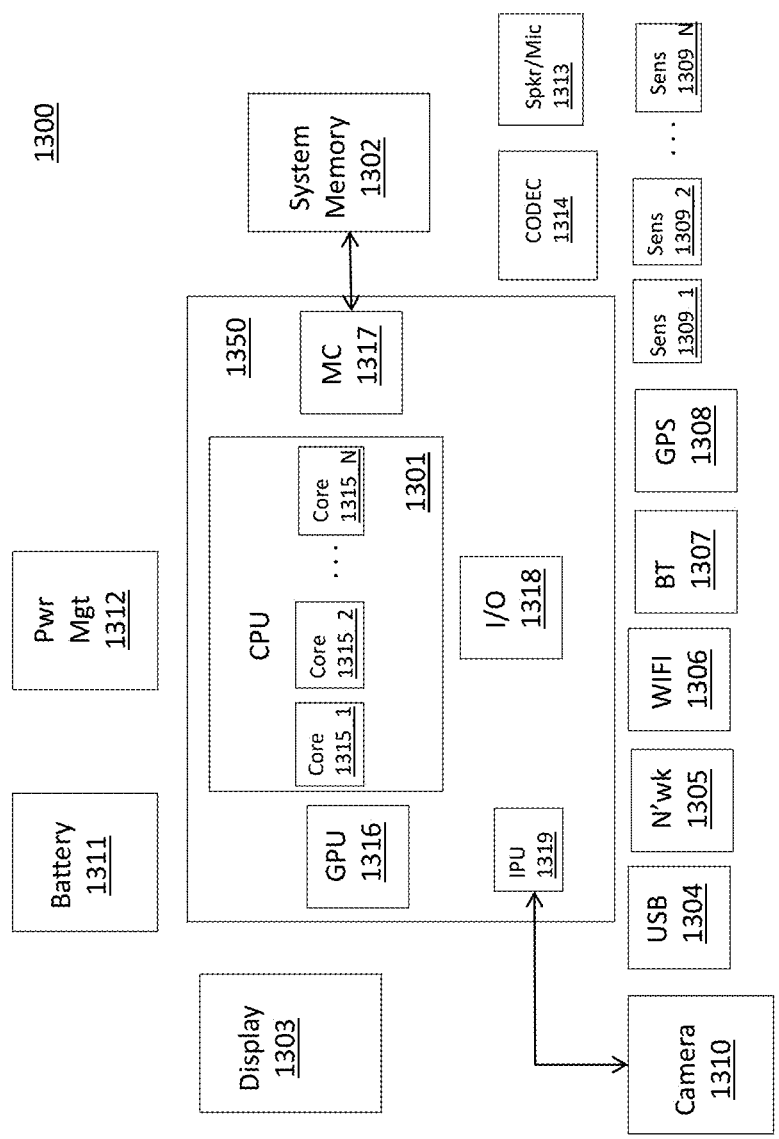
FIG. 13 shows another embodiment of an image processor.

FIG. 13 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two. Additionally, the computing system of FIG. 13 also includes many features of a high performance computing system, such as a workstation or supercomputer.

As observed in FIG. 13, the basic computing system may include a central processing unit 1301 (which may include, e.g., a plurality of general purpose processing cores 1315_1 through 1315_N and a main memory controller 1317 disposed on a multi-core processor or applications processor), system memory 1302, a display 1303 (e.g., touchscreen, flat-panel), a local wired point-to-point link (e.g., USB) interface 1304, various network I/O functions 1305 (such as an Ethernet interface and/or cellular modem subsystem), a wireless local area network (e.g., WiFi) interface 1306, a wireless point-to-point link (e.g., Bluetooth) interface 1307 and a Global Positioning System interface 1308, various sensors 1309_1 through 1309_N, one or more cameras 1310, a battery 1311, a power management control unit 1312, a speaker and microphone 1313 and an audio coder/decoder 1314.

An applications processor or multi-core processor 1350 may include one or more general purpose processing cores 1315 within its CPU 1201, one or more graphical processing units 1316, a memory management function 1317 (e.g., a memory controller), an I/O control function 1318 and an image processing unit 1319. The general purpose processing cores 1315 typically execute the operating system and application software of the computing system. The graphics processing units 1316 typically execute graphics intensive functions to, e.g., generate graphics information that is presented on the display 1303. The memory control function 1317 interfaces with the system memory 1302 to write/read data to/from system memory 1302. The power management control unit 1312 generally controls the power consumption of the system 1300.

The image processing unit 1319 may be implemented according to any of the image processing unit embodiments described at length above in the preceding sections. Alternatively or in combination, the IPU 1319 may be coupled to either or both of the GPU 1316 and CPU 1301 as a co-processor thereof. Additionally, in various embodiments, the GPU 1316 may be implemented with any of the image processor features described at length above. The image processing unit 1319 may be configured with application software as described at length above. Additionally, a computing system such as the computing system of FIG. 13 may execute program code that simulates an image processing application software program as described above so that respective memory allocations for respective line buffer units can be determined.

Each of the touchscreen display 1303, the communication interfaces 1304-1307, the GPS interface 1308, the sensors 1309, the camera 1310, and the speaker/microphone codec 1313, 1314 all can be viewed as various forms of I/O (input and/or output) relative to the overall computing system including, where appropriate, an integrated peripheral device as well (e.g., the one or more cameras 1310). Depending on implementation, various ones of these I/O components may be integrated on the applications processor/multi-core processor 1350 or may be located off the die or outside the package of the applications processor/multi-core processor 1350. In an embodiment one or more cameras 1310 includes a depth camera capable of measuring depth between the camera and an object in its field of view.

Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired and/or programmable logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method performed by one or more computers, the method comprising:
receiving an application software program having a plurality of kernels to be executed on a processor having a plurality of configurable line buffers,
wherein each kernel comprises load instructions that read from a line buffer storing data produced by another kernel, store instructions that write to a line buffer storing data to be consumed by another kernel, or both;
simulating stall conditions when executing the plurality of kernels on the processor using a plurality of simulated line buffers, including:
simulating each load instruction occurring in the plurality of kernels including updating a respective read pointer for a respective simulated line buffer referenced by the load instruction, and
simulating each store instruction of each kernel occurring in the plurality of kernels including waiting until all simulated consuming kernels of the kernel are stalled for data of the write instruction before updating a respective write pointer for a respective simulated line buffer referenced by the store instruction; and
allocating a respective line buffer size to each configurable line buffer of the processor, wherein each line buffer size is based on a respective maximum difference encountered between a respective read pointer and a respective write pointer of a simulated version of the line buffer.

2. The method of claim 1, wherein each simulated line buffer has an unbounded memory size.

3. The method of claim 1, further comprising continually updating the respective maximum difference between each read pointer and each write pointer for each respective simulated line buffer.

4. The method of claim 1, further comprising stripping out one or more instructions that are not load or store instructions from one or more of the plurality of kernels.

5. The method of claim 4, further comprising simulating respective delays for instructions that were stripped out of one or more of the plurality of kernels.

6. The method of claim 1, wherein the each simulated line buffer corresponds to a respective line buffer of the processor having a plurality of line buffers configured to buffer data among a plurality of processing cores of the processor.

7. The method of claim 1, further comprising executing the application software program on the processor using the allocated line buffer sizes for the plurality of line buffers.

8. The method of claim 1, wherein executing the application software program on the processor using the allocated line buffer sizes for the plurality of line buffers results in a producer kernel of the application software program generating new data approximately no later than when one or more consumer kernels stall.

9. A system comprising:
one or more computers and one or more storage devices storing instructions that are operable, when executed by the one or more computers, to cause the one or more computers to perform operations comprising:
receiving an application software program having a plurality of kernels to be executed on a processor having a plurality of configurable line buffers,
wherein each kernel comprises load instructions that read from a line buffer storing data produced by another kernel, store instructions that write to a line buffer storing data to be consumed by another kernel, or both;
simulating stall conditions when executing the plurality of kernels on the processor using a plurality of simulated line buffers, including:
simulating each load instruction occurring in the plurality of kernels including updating a respective read pointer for a respective simulated line buffer referenced by the load instruction, and
simulating each store instruction of each kernel occurring in the plurality of kernels including waiting until all simulated consuming kernels of the kernel are stalled for data of the write instruction before updating a respective write pointer for a respective simulated line buffer referenced by the store instruction; and
allocating a respective line buffer size to each configurable line buffer of the processor, wherein each line buffer size is based on a respective maximum difference encountered between a respective read pointer and a respective write pointer of a simulated version of the line buffer.

10. The system of claim 9, wherein each simulated line buffer has an unbounded memory size.

11. The system of claim 9, wherein the operations further comprise continually updating the respective maximum difference between each read pointer and each write pointer for each respective simulated line buffer.

12. The system of claim 9, wherein the operations further comprise stripping out one or more instructions that are not load or store instructions from one or more of the plurality of kernels.

13. The system of claim 12, wherein the operations further comprise simulating respective delays for instructions that were stripped out of one or more of the plurality of kernels.

14. The system of claim 9, wherein the each simulated line buffer corresponds to a respective line buffer of the processor having a plurality of line buffers configured to buffer data among a plurality of processing cores of the processor.

15. The system of claim 9, wherein the operations further comprise executing the application software program on the processor using the allocated line buffer sizes for the plurality of line buffers.

16. The system of claim 9, wherein executing the application software program on the processor using the allocated line buffer sizes for the plurality of line buffers results in a producer kernel of the application software program generating new data approximately no later than when one or more consumer kernels stall.

17. One or more non-transitory computer storage media encoded with computer program instructions that when executed by one or more computers cause the one or more computers to perform operations comprising:
receiving an application software program having a plurality of kernels to be executed on a processor having a plurality of configurable line buffers,
wherein each kernel comprises load instructions that read from a line buffer storing data produced by another kernel, store instructions that write to a line buffer storing data to be consumed by another kernel, or both;
simulating stall conditions when executing the plurality of kernels on the processor using a plurality of simulated line buffers, including:

simulating each load instruction occurring in the plurality of kernels including updating a respective read pointer for a respective simulated line buffer referenced by the load instruction, and simulating each store instruction of each kernel occurring in the plurality of kernels including waiting until all simulated consuming kernels of the kernel are stalled for data of the write instruction before updating a respective write pointer for a respective simulated line buffer referenced by the store instruction; and allocating a respective line buffer size to each configurable line buffer of the processor, wherein each line buffer size is based on a respective maximum difference encountered between a respective read pointer and a respective write pointer of a simulated version of the line buffer.

* * * * *